US012510991B2

(12) United States Patent
Lee et al.

(10) Patent No.: US 12,510,991 B2
(45) Date of Patent: Dec. 30, 2025

(54) INPUT SENSING PART AND DISPLAY DEVICE INCLUDING THE SAME

(71) Applicant: Samsung Display Co., Ltd., Yongin-Si (KR)

(72) Inventors: Seungchan Lee, Yongin-si (KR); Gyung-Min Ko, Yongin-si (KR); Yong-Hwan Park, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/770,663

(22) Filed: Jul. 12, 2024

(65) Prior Publication Data

US 2025/0216972 A1 Jul. 3, 2025

(30) Foreign Application Priority Data

Dec. 28, 2023 (KR) .................. 10-2023-0195193

(51) Int. Cl.
*G06F 3/041* (2006.01)
*G06F 3/044* (2006.01)
*H10K 59/40* (2023.01)

(52) U.S. Cl.
CPC ........ *G06F 3/04164* (2019.05); *G06F 3/0446* (2019.05); *H10K 59/40* (2023.02)

(58) Field of Classification Search
CPC .. G06F 3/04164; G06F 3/0446; G06F 3/0443; G06F 2203/04111; H10K 59/40
See application file for complete search history.

(56) References Cited

U.S. PATENT DOCUMENTS

| 10,712,889 | B2* | 7/2020 | Park | G06F 3/0443 |
| 11,429,211 | B2* | 8/2022 | Kim | G06F 3/0446 |
| 2018/0284924 | A1* | 10/2018 | Watanabe | G06F 3/0412 |
| 2019/0095007 | A1* | 3/2019 | Jeong | H10K 59/131 |
| 2019/0235678 | A1* | 8/2019 | Kim | G06F 3/044 |
| 2020/0295092 | A1* | 9/2020 | Moon | H10K 59/40 |
| 2020/0401273 | A1* | 12/2020 | Bang | H10K 71/70 |
| 2024/0122012 | A1* | 4/2024 | Harada | H10K 59/40 |
| 2025/0004590 | A1* | 1/2025 | Lee | G06F 3/0412 |

FOREIGN PATENT DOCUMENTS

KR 10-2508964 B1 3/2023

* cited by examiner

*Primary Examiner* — Amy Onyekaba
(74) *Attorney, Agent, or Firm* — Innovation Counsel LLP

(57) ABSTRACT

An input sensing part is disclosed that includes a first sensing electrode, a second sensing electrode that crosses the first sensing electrode and is insulated from the first sensing electrode, a first line connected to the first sensing electrode, a second line that is connected to the second sensing electrode and that includes a second-first line and a second-second line disposed on the second-first line, and an insulating layer disposed between the second-first line and the second-second line. The second-second line is connected to the second-first line through a first contact hole defined in the insulating layer. An inner surface of the insulating layer that defines the first contact hole has a first inclined surface, and the first inclined surface comprises a first-first portion. The second-second line defines a first-first opening that corresponds to the first-first portion of the first inclined surface.

20 Claims, 23 Drawing Sheets

INPUT SENSING PART AND DISPLAY DEVICE INCLUDING THE SAME

CROSS-REFERENCE TO RELATED APPLICATIONS

This application claims priority under 35 U.S.C. § 119 to Korean Patent Application No. 10-2023-0195193 filed on Dec. 28, 2023, in the Korean Intellectual Property Office, the disclosure of which is incorporated by reference herein in its entirety.

BACKGROUND

Embodiments of the present disclosure described herein relate to an input sensing part and a display device including the same.

Electronic devices, such as smart phones, digital cameras, notebook computers, car navigation units, smart televisions, and the like, which provide an image to a user include a display device for displaying an image. The display device includes a display panel for generating the image and an input device such as an input sensing part.

The input sensing unit is disposed on the display panel and senses a touch of a user. A touch sensing part includes first sensing electrodes, first lines connected to the first sensing electrodes, second sensing electrodes, and second lines connected to the second sensing electrodes. The first and second sensing electrodes extend to cross each other while being insulated from each other, and capacitance is formed by the first and second sensing electrodes. A drive signal is applied to the first sensing electrodes through the first lines, and a sensing signal detected from the second sensing electrodes is output through the second lines.

Each of the first and second lines has a multi-layer structure. For example, each of the first and second lines includes a lower line and an upper line disposed on the lower line and connected to the lower line. A contact hole is defined in an insulating layer disposed between the lower line and the upper line, and the upper line is connected to the lower line through the contact hole.

SUMMARY

Embodiments of the present disclosure provide an input sensing part which prevents a rainbow-colored band shape from appearing on lines connected to sensing electrodes and a display device including the input sensing part.

According to an embodiment, an input sensing part includes a first sensing electrode, a second sensing electrode that crosses the first sensing electrode and is insulated from the first sensing electrode, a first line connected to the first sensing electrode, a second line that is connected to the second sensing electrode and that comprises a second-first line and a second-second line disposed on the second-first line, and an insulating layer disposed between the second-first line and the second-second line. The second-second line is connected to the second-first line through a first contact hole defined in the insulating layer. An inner surface of the insulating layer that defines the first contact hole has a first inclined surface, and the first inclined surface comprises a first-first portion. The second-second line defines a first-first opening that corresponds to the first-first portion of the first inclined surface.

According to an embodiment, a display device includes a display panel and an input sensing part disposed on the display panel. The input sensing part includes a first sensing electrode, a second sensing electrode that crosses the first sensing electrode and is insulated from the first sensing electrode, a first line connected to the first sensing electrode, a second line that is connected to the second sensing electrode and that comprises a second-first line and a second-second line disposed on the second-first line, and an insulating layer disposed between the second-first line and the second-second line. The second-second line is connected to the second-first line through a first contact hole defined in the insulating layer. An inner surface of the insulating layer that defines the first contact hole has a first inclined surface, and the first inclined surface comprises a first-first portion and a first-second portion. The second-second line defines a first-first opening that corresponds to the first-first portion of the first inclined surface and a first-second opening that corresponds to a first-second portion of the first inclined surface.

BRIEF DESCRIPTION OF THE FIGURES

The above and other features of the present disclosure will become apparent with reference to the descriptions below and the accompanying drawings.

DETAILED DESCRIPTION

Figure 1:
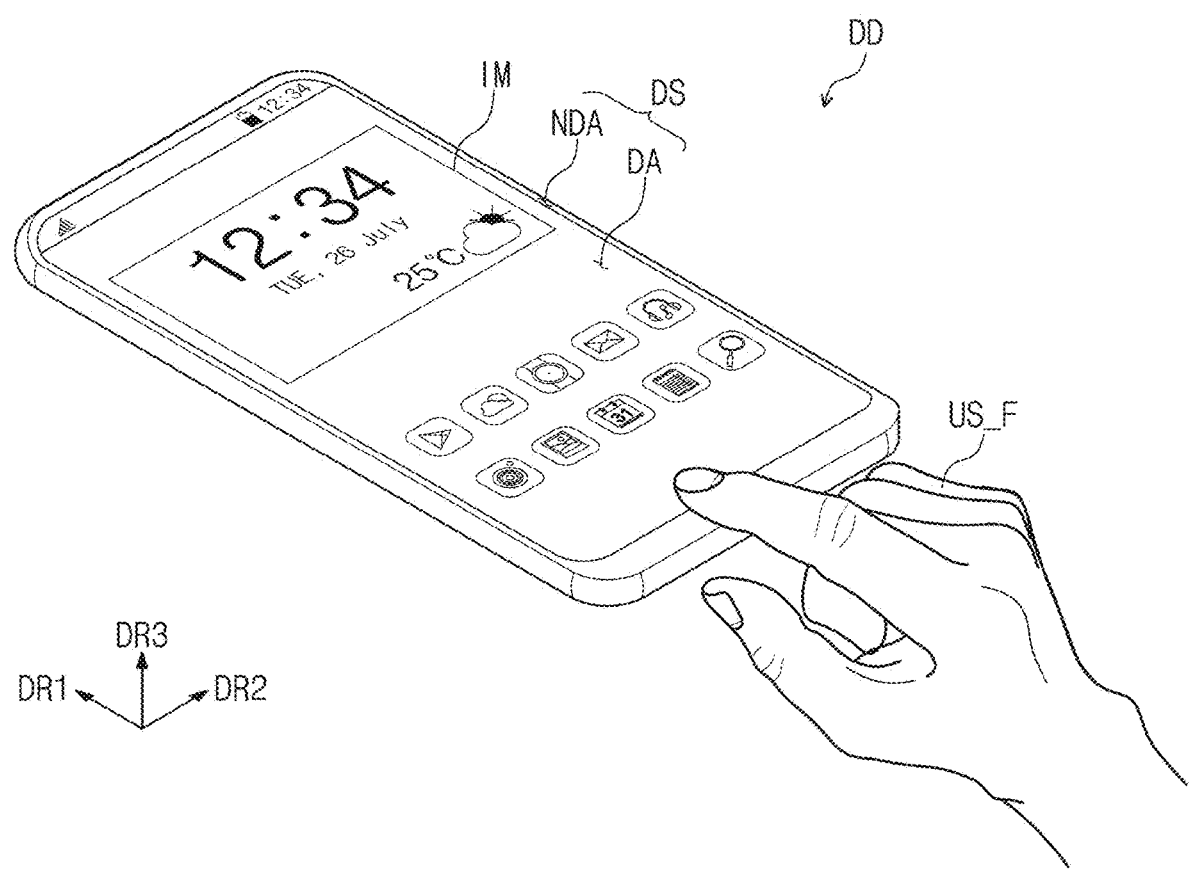
FIG. 1 is a perspective view of a display device according to an embodiment of the present disclosure.

In this present disclosure, it will be understood that when an element (or, an area, a layer, a part, etc.) is referred to as being "on", "connected to" or "coupled to" another element or layer, it can be directly on, connected to or coupled to the other element or layer or intervening elements or layers may be present.

Like numerals refer to like elements throughout. Additionally, in the drawings, the thicknesses, proportions, and dimensions of components are exaggerated for effective description.

As used herein, the term "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

It will be understood that, although the terms first, second, etc. may be used to describe various elements, these elements should not be limited by the terms. These terms may be used only for distinguishing one element from another element. For example, without departing from the teaching of the present disclosure, a first element may be referred to as a second element, and similarly, the second element may also be referred to as the first element. As used herein, the singular form, "a", "an" and "the", may include plural forms unless the context clearly indicates otherwise.

In addition, relative terms, such as "below", "under", "above", "over" and the like, may be used to describe a relationship of elements illustrated in the drawings. These terms represent relative concepts and are described based on directions illustrated in the drawing.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It should be understood that terms such as "comprise", "include", and "have" as well as their variations such as "including", when used herein, specify the presence of stated features, numbers, steps, operations, components, parts, or combinations thereof, but do not preclude the presence or addition of one or more other features, numbers, steps, operations, components, parts, or combinations thereof.

Hereinafter, embodiments of the present disclosure will be described with reference to the accompanying drawings.

FIG. 1 is a perspective view of a display device according to an embodiment of the present disclosure.

Referring to FIG. 1, the display device DD according to an embodiment of the present disclosure may have a quadrangular shape with long sides extending in a first direction DR1 and short sides extending in a second direction DR2 crossing the first direction DR1. However, without being limited thereto, the display device DD may have various shapes such as a circular shape, a polygonal shape, and the like.

Hereinafter, a direction substantially perpendicular to a plane defined by the first direction DR1 and the second direction DR2 is referred to as a third direction DR3. As used herein, the expression "when viewed from above the plane" may mean that it is viewed in the third direction DR3.

The upper surface of the display device DD may be a display surface DS and may have a plane defined by the first direction DR1 and the second direction DR2. A user may conceive Images IM generated by the display device DD through the display surface DS. The display device DD may sense a touch of the user's hand US_F on the display device DD.

The display surface DS may include a display area DA and a non-display area NDA around the display area DA. The display area DA may display an image, and the non-display area NDA may not display an image. The non-display area NDA may surround the display area DA and may define a border of the display device DD that is printed in a certain color.

Figure 2:
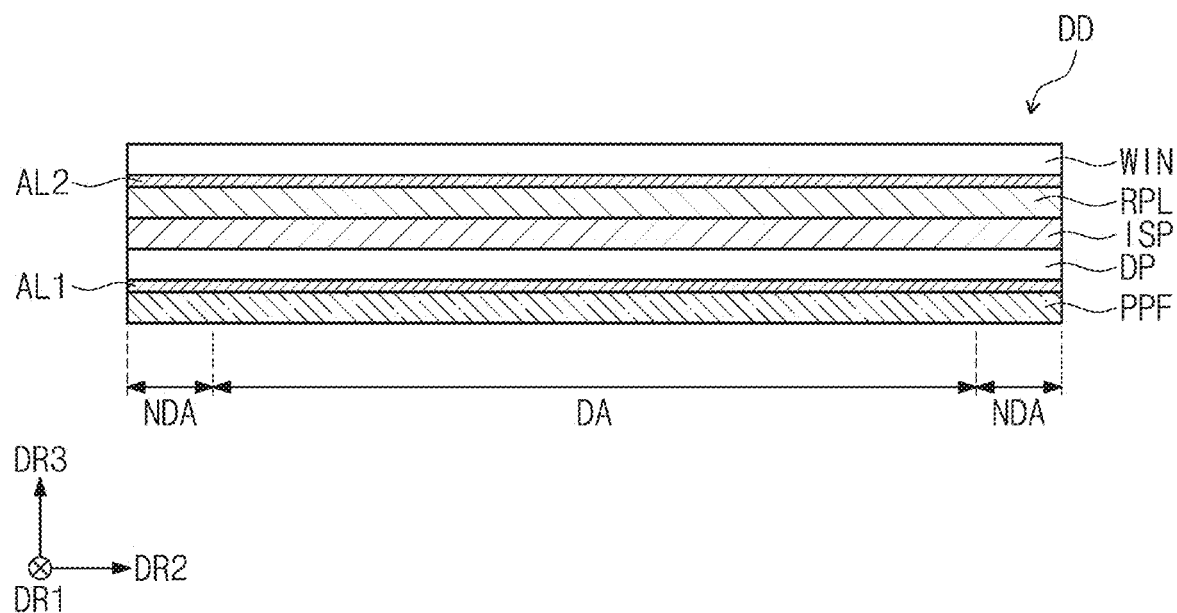
FIG. 2 is a cross-sectional view of the display device illustrated in FIG. 1.

FIG. 2 is a cross-sectional view of the display device illustrated in FIG. 1.

In FIG. 2, a cross-section of the display device DD viewed in the first direction DR1 is illustrated.

Referring to FIG. 2, the display device DD may include a display panel DP, an input sensing part ISP, an anti-reflective layer RPL, a window WIN, a panel protection film PPF, and first and second adhesive layers AL1 and AL2.

The display panel DP may be a flexible display panel. The display panel DP according to an embodiment of the present disclosure may be an emissive display panel, but is not particularly limited thereto. For example, the display panel DP may be an organic light emitting display panel or an inorganic light emitting display panel. An emissive layer of the organic light emitting display panel may include an organic luminescent material. An emissive layer of the inorganic light emitting display panel may include quantum dots, quantum rods, and the like. Hereinafter, it will be exemplified that the display panel DP is an organic light emitting display panel.

The input sensing part ISP may be disposed on the display panel DP. The input sensing part ISP may include a plurality of sensing parts (not illustrated) for sensing an external input in a capacitive type. The input sensing part ISP may be directly manufactured on the display panel DP when the display device DD is manufactured. However, without being limited thereto, the input sensing part ISP may be manufactured as a panel separate from the display panel DP and may be attached to the display panel DP by an adhesive layer.

The anti-reflective layer RPL may be disposed on the input sensing part ISP. The anti-reflective layer RPL may be directly manufactured on the input sensing part ISP when the display device DD is manufactured. However, without being limited thereto, the anti-reflective layer RPL may be manufactured as a separate panel and may be attached to the input sensing part ISP with an adhesive layer.

The anti-reflective layer RPL may be a film for preventing reflection of external light. The anti-reflective layer RPL may decrease the reflectance of external light incident toward the display panel DP from above the display device DD. Due to the anti-reflective layer RPL, the user may not conceive the reflection of external light.

When external light incident to the display panel DP is reflected from the display panel DP and come back to the user, the user may recognize the display panel DP light as a mirror. To prevent such an effect, the anti-reflective layer RPL may include a plurality of color filters that display the same colors as those of pixels of the display panel DP.

The color filters may filter the external light into the same colors as those of the pixels such that the user may not conceive the reflected external light. However, without being limited thereto, the anti-reflective layer RPL may include a phase retarder or a polarizer to decrease the reflectance of the external light.

The window WIN may be disposed on the anti-reflective layer RPL. The window WIN may protect the display panel DP, the input sensing part ISP, and the anti-reflective layer RPL from external scratches and impacts.

The panel protection film PPF may be disposed under the display panel DP. The panel protection film PPF may protect a lower portion of the display panel DP. The panel protection film PPF may include a flexible plastic material such as polyethylene terephthalate (PET).

The first adhesive layer AL1 may be disposed between the display panel DP and the panel protection film PPF, and the display panel DP and the panel protection film PPF may be attached to each other by the first adhesive layer AL1. The second adhesive layer AL2 may be disposed between the window WIN and the anti-reflective layer RPL, and the window WIN and the anti-reflective layer RPL may be attached to each other by the second adhesive layer AL2.

Figure 3:
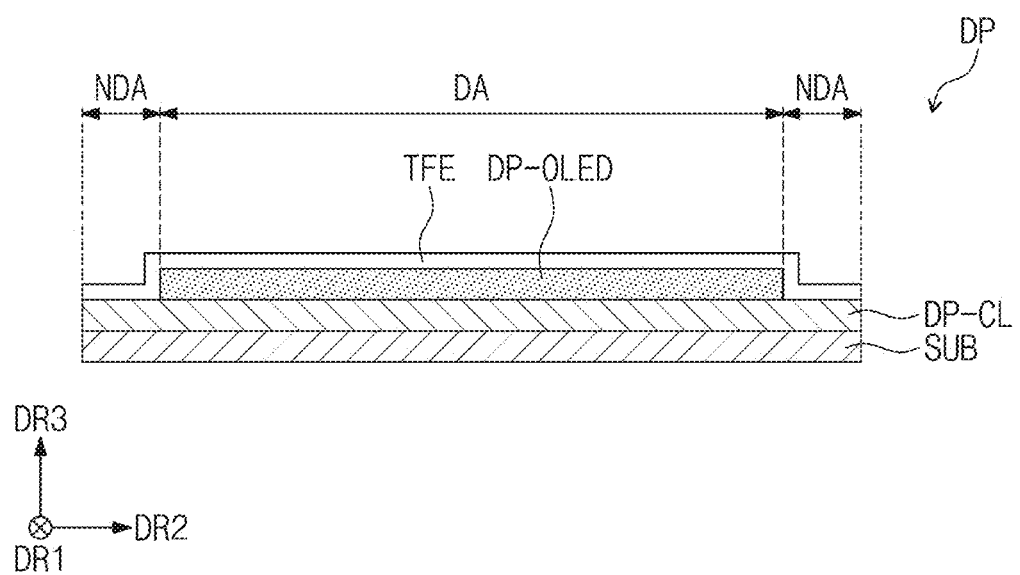
FIG. 3 is a cross-sectional view of a display panel illustrated in FIG. 2.

FIG. 3 is a cross-sectional view of the display panel illustrated in FIG. 2.

In FIG. 3, a cross-section of the display panel DP viewed in the first direction DR1 is illustrated.

Referring to FIG. 3, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include a display area DA and a non-display area NDA around the display area DA. The substrate SUB may include a flexible plastic material such as glass or polyimide (PI). The display element layer DP-OLED may be disposed on the display area DA.

A plurality of pixels may be disposed in the circuit element layer DP-CL and the display element layer DP-OLED. Each of the pixels may include transistors disposed in the circuit element layer DP-CL and a light emitting element disposed in the display element layer DP-OLED and connected to the transistors.

The thin film encapsulation layer TFE may be disposed on the circuit element layer DP-CL to cover the display element layer DP-OLED. The thin film encapsulation layer TFE may protect the pixels from moisture, oxygen, and foreign substances.

Figure 4:
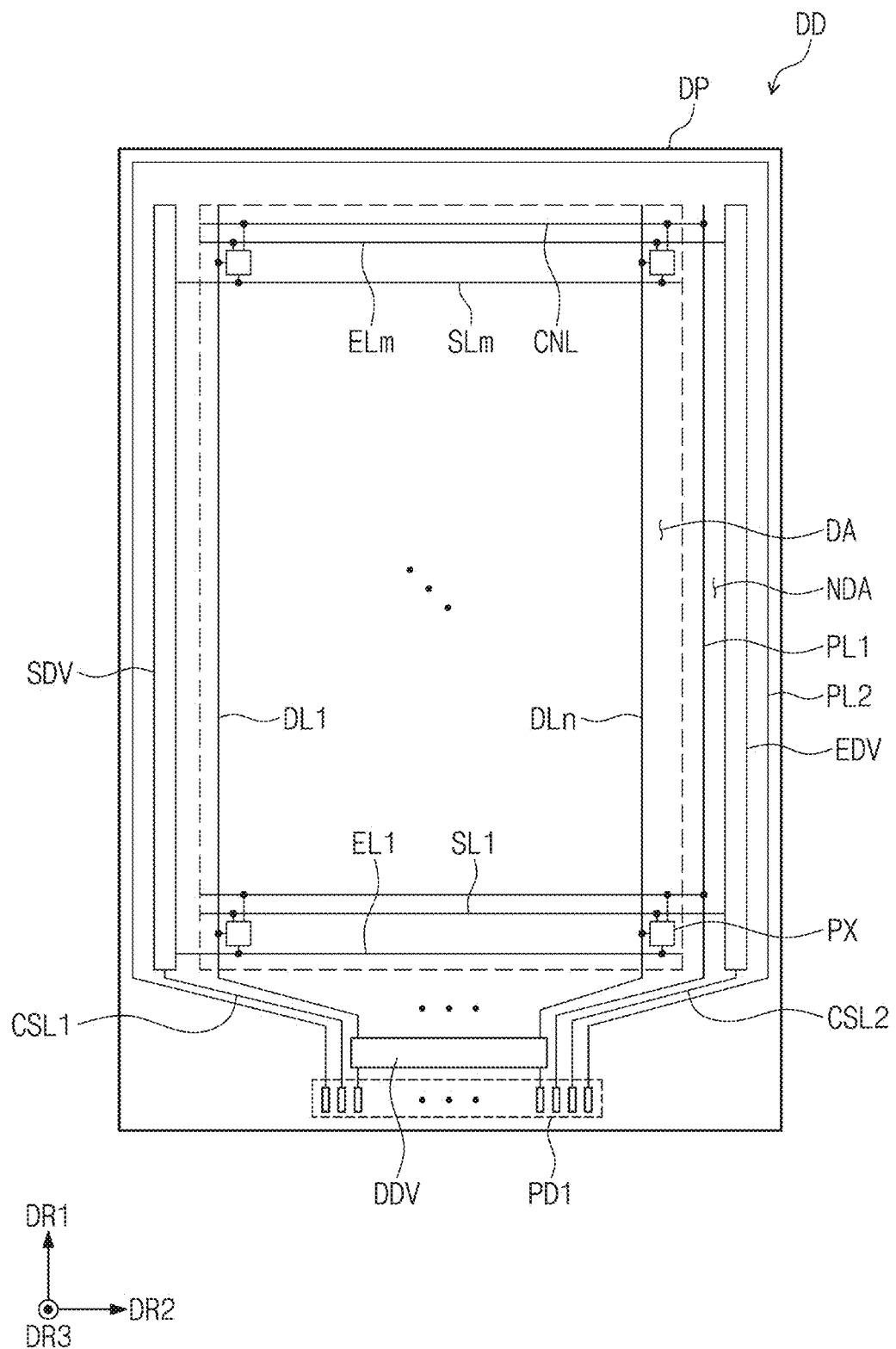
FIG. 4 is a plan view of the display panel illustrated in FIG. 2.

FIG. 4 is a plan view of the display panel illustrated in FIG. 2.

Referring to FIG. 4, the display device DD may include the display panel DP, a scan driver SDV, a data driver DDV, a light emission driver EDV, and a plurality of first pads PD1.

The display panel DP may have a rectangular shape with long sides extending in the first direction DR1 and short sides extending in the second direction DR2. However, the shape of the display panel DP is not limited thereto. The display panel DP may include a display area DA and a non-display area NDA surrounding the display area DA.

The display panel DP may include a plurality of pixels PX, a plurality of scan lines SL1 to SLm, a plurality of data lines DL1 to DLn, a plurality of light emission lines EL1 to ELm, first and second control lines CSL1 and CSL2, first and second power lines PL1 and PL2, and connecting lines CNL. Here, "m" and "n" are natural numbers.

The pixels PX may be disposed in the display area DA. The scan driver SDV and the light emission driver EDV may be disposed in the non-display area NDA adjacent to the long sides of the display panel DP, respectively. The data driver DDV may be disposed in the non-display area NDA adjacent to one of the short sides of the display panel DP. The data driver DDV may be adjacent to the lower side of the display panel DP when viewed from the above.

The scan lines SL1 to SLm may extend in the second direction DR2 and may connect the pixels PX to the scan driver SDV. The data lines DL1 to DLn may extend in the first direction DR1 and may connect the pixels PX to the data driver DDV. The light emission lines EL1 to ELm may extend in the second direction DR2 and may connect the pixels PX to the light emission driver EDV.

The first power line PL1 may extend in the first direction DR1 and may be disposed in the non-display area NDA. The first power line PL1 may be disposed between the display area DA and the light emission driver EDV. However, without being limited thereto, the first power line PL1 may be disposed between the display area DA and the scan driver SDV.

The connecting lines CNL may extend in the second direction DR2 and may be arranged in the first direction DR1 and connect the first power line PL1 to the pixels PX. A first voltage may be applied to the pixels PX through the first power line PL1 and the connecting lines CNL.

The second power line PL2 may be disposed in the non-display area NDA and may extend along the long sides of the display panel DP and the other short side of the display panel DP where the data driver DDV is not disposed. The second power line PL2 may be disposed outside of the scan driver SDV and the light emission driver EDV.

Although not illustrated, the second power line PL2 may extend toward the display area DA and may be connected to the pixels PX. A second voltage having a lower level than the first voltage may be applied to the pixels PX through the second power line PL2.

The first control line CSL1 may be connected to the scan driver SDV and may extend toward the lower side of the display panel DP. The second control line CSL2 may be connected to the light emission driver EDV and may extend toward the lower side of the display panel DP. The data driver DDV may be disposed between the first control line CSL1 and the second control line CSL2.

The first pads PD1 may be disposed in the non-display area NDA adjacent to the lower side of the display panel DP and may be closer to the lower side of the display panel DP than the data driver DDV. The data driver DDV, the first power line PL1, the second power line PL2, the first control line CSL1, and the second control line CSL2 may be connected to the first pads PD1. The data lines DL1 to DLn may be connected to the data driver DDV, and the data driver DDV may be connected to the first pads PD1 corresponding to the data lines DL1 to DLn.

Although not illustrated, the display device DD may further include a timing controller for controlling operations of the scan driver SDV, the data driver DDV, and the light emission driver EDV and a voltage generator for generating the first and second voltages. The timing controller and the voltage generator may be connected to the first pads PD1 through a printed circuit board.

The scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The light emission driver EDV may generate a plurality of light emission signals, and the light emission signals may be applied to the pixels PX through the light emission lines EL1 to ELm.

The pixels PX may receive the data voltages in response to the scan signals. The pixels PX may display an image by emitting light having luminance corresponding to the data voltages in response to the light emission signals.

Figure 5:
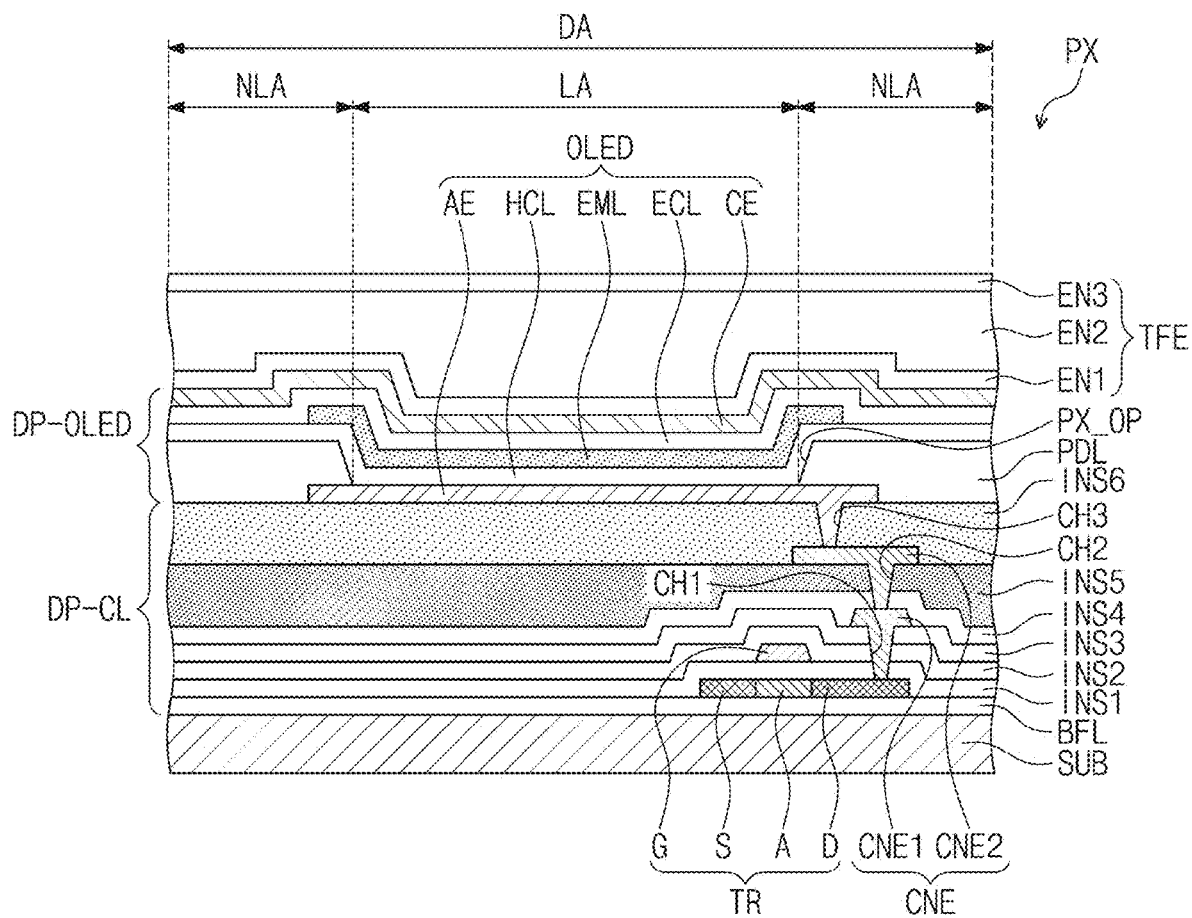
FIG. 5 is a cross-sectional view of one of pixels illustrated in FIG. 4.

FIG. 5 is a cross-sectional view of one of the pixels illustrated in FIG. 4.

Referring to FIG. 5, the pixel PX may include a transistor TR and a light emitting element OLED. The light emitting element OLED may include a first electrode AE (or, an anode), a second electrode CE (or, a cathode), a hole control layer HCL, an electron control layer ECL, and an emissive layer EML.

The transistor TR and the light emitting element OLED may be disposed on the substrate SUB. Although one transistor TR is illustrated as an example, the pixel PX may include a plurality of transistors and at least one capacitor for driving the light emitting element OLED.

The display area DA may include an emissive area LA corresponding to each of the pixels PX and a non-emissive area NLA around the emissive area LA. The light emitting element OLED may be disposed in the emissive area LA.

A buffer layer BFL may be disposed on the substrate SUB. The buffer layer BFL may be an inorganic layer. A semiconductor pattern may be disposed on the buffer layer BFL. The semiconductor pattern may include poly silicon, amorphous silicon, or metal oxide.

The semiconductor pattern may be doped with an N-type dopant or a P-type dopant. The semiconductor pattern may include highly-doped areas and a lightly-doped area. The highly-doped areas may have a higher conductivity than the lightly-doped area and may serve as a source electrode or a drain electrode of the transistor TR. The lightly-doped area may correspond to an active (or, channel) area of the transistor TR.

The source electrode S, the active area A, and the drain electrode D of the transistor TR may be formed from the semiconductor pattern. A first insulating layer INS1 may be disposed on the semiconductor pattern. A gate electrode G of the transistor TR may be disposed on the first insulating layer INS1. A second insulating layer INS2 may be disposed on the gate electrode G. A third insulating layer INS3 may be disposed on the second insulating layer INS2.

To connect the transistor TR to the light emitting element OLED, a connecting electrode CNE may include a first connecting electrode CNE1 and a second connecting electrode CNE2. The first connecting electrode CNE1 may be disposed on the third insulating layer INS3 and may be connected to the drain electrode D through a first contact hole CH1 extending through the first to third insulating layers INS1 to INS3.

A fourth insulating layer INS4 may be disposed on the first connecting electrode CNE1 and the third insulating layer INS3. A fifth insulating layer INS5 may be disposed on the fourth insulating layer INS4. The second connecting electrode CNE2 may be disposed on the fifth insulating layer INS5. The second connecting electrode CNE2 may be connected to the first connecting electrode CNE1 through a second contact hole CH2 extending through the fourth and fifth insulating layers INS4 and INS5.

A sixth insulating layer INS6 may be disposed on the second connecting electrode CNE2 and the fifth insulating layer INS5. The layers from the buffer layer BFL to the sixth insulating layer INS6 may be defined as the circuit element layer DP-CL. The first to sixth insulating layers INS1 to INS6 may be inorganic layers or organic layers.

The first electrode AE may be disposed on the sixth insulating layer INS6. The first electrode AE may be connected to the second connecting electrode CNE2 through a third contact hole CH3 extending through the sixth insulating layer INS6. A pixel defining layer PDL having an opening PX_OP which exposes a certain portion of the first electrode AE may be disposed on the first electrode AE and the sixth insulating layer INS6.

The hole control layer HCL may be disposed on the first electrode AE and the pixel defining layer PDL. The hole control layer HCL may include a hole transport layer and a hole injection layer.

The emissive layer EML may be disposed on the hole control layer HCL. The emissive layer EML may be disposed in an area corresponding to the opening PX_OP. The emissive layer EML may include an organic material or an inorganic material. The emissive layer EML may generate one of red light, green light, and blue light.

The electron control layer ECL may be disposed on the emissive layer EML and the hole control layer HCL. The electron control layer ECL may include an electron transport layer and an electron injection layer. The hole control layer HCL and the electron control layer ECL may be commonly disposed in the emissive area LA and the non-emissive area NLA.

The second electrode CE may be disposed on the electron control layer ECL. The second electrode CE may be commonly disposed to cover the pixels PX. The layer in which the light emitting element OLED is disposed may be defined as the display element layer DP-OLED.

The thin film encapsulation layer TFE may be disposed on the second electrode CE and may cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 may include an inorganic insulating layer and may protect the pixel PX from moisture and oxygen. The second encapsulation layer EN2 may include an organic insulating layer and may protect the pixel PX from foreign substances such as dust particles.

The first voltage may be applied to the first electrode AE through the transistor TR, and the second voltage having a lower level than the first voltage may be applied to the second electrode CE. Holes and electrons injected into the emissive layer EML may be combined to form excitons, and as the excitons transition to a ground state, the light emitting element OLED may emit light.

Figure 6:
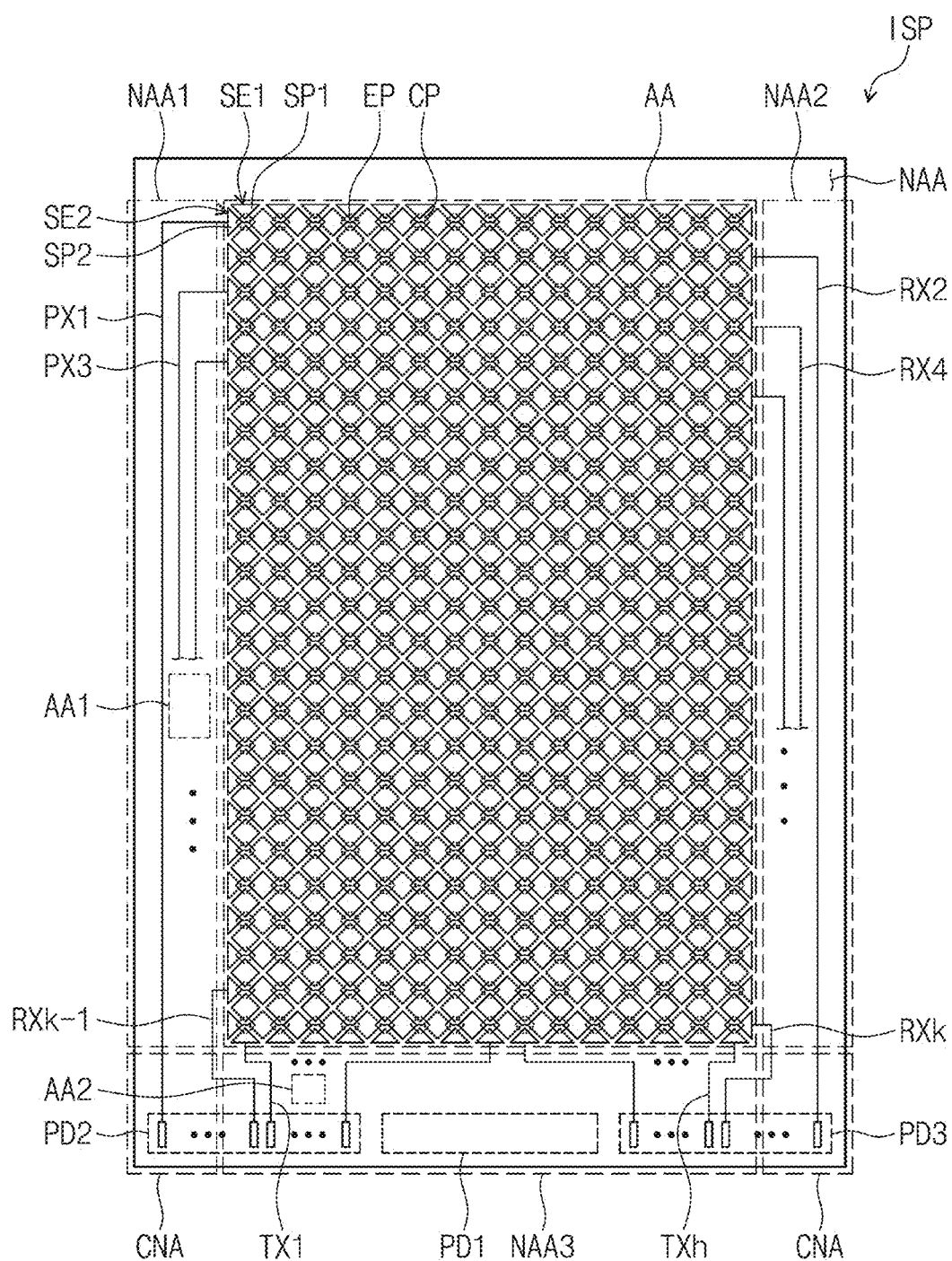
FIG. 6 is a plan view of an input sensing part illustrated in FIG. 2.

FIG. 6 is a plan view of the input sensing part illustrated in FIG. 2.

Referring to FIG. 6, the input sensing part ISP may include a plurality of sensing electrodes SE1 and SE2, a plurality of lines TX1 to TXh and RX1 to RXk, a plurality of second pads PD2, and a plurality of third pads PD3. Here, "h" and "k" are natural numbers. The sensing electrodes SE1 and SE2, the lines TX1 to TXh and RX1 to RXk, and the second and third pads PD2 and PD3 may be disposed on the thin film encapsulation layer TFE.

The input sensing part ISP may include an active area AA and an inactive area NAA around the active area AA. The active area AA may overlap the display area DA, and the non-active area NAA may overlap the non-display area NDA.

The sensing electrodes SE1 and SE2 may be disposed in the active area AA, and the second and third pads PD2 and PD3 may be disposed in the inactive area NAA. The second pads PD2 and the third pads PD3 may be adjacent to the lower side of the input sensing part ISP when viewed from the above. The first pads PD1 may be disposed between the second pads PD2 and the third pads PD3 when viewed from the above.

The lines TX1 to TXh and RX1 to RXk may be connected to first ends of the sensing electrodes SE1 and SE2, may extend to the inactive area NAA, and may be connected to the second and third pads PD2 and PD3. Although not illustrated in FIG. 6, a sensing controller for controlling the input sensing part ISP may be connected to the second and third pads PD2 and PD3 through a printed circuit board.

The sensing electrodes SE1 and SE2 may include a plurality of first sensing electrodes SE1 that extend in the first direction DR1 and are arranged along the second direction DR2, and a plurality of second sensing electrodes SE2 that extend in the second direction DR2 and are arranged along the first direction DR1. The second sensing electrodes SE2 may be insulated from the first sensing electrodes SE1 and may cross the first sensing electrodes SE1.

The lines TX1 to TXh and RX1 to RXk may include a plurality of first lines TX1 to TXh connected to the first sensing electrodes SE1 and a plurality of second lines RX1 to RXk connected to the second sensing electrodes SE2. The first lines TX1 to TXh and the second lines RX1 to RXk may extend to the inactive area NAA and may be connected to the second pads PD2 and the third pads PD3.

The first lines TX1 to TXh, when viewed from the above, may be disposed in the inactive area NAA adjacent to the active area AA in the first direction DR1. For example, the first lines TX1 to TXh, when viewed from the above, may be disposed in the inactive area NAA adjacent to the lower side of the active area AA. The first lines TX1 to TXh may be referred to as transmission lines.

The second lines RX1 to RXk, when viewed from the above, may be disposed in the inactive area NAA adjacent to the active area AA in the second direction DR2. For example, the second lines RX1 to RXk, when viewed from the above, may be disposed in the inactive areas NAA adjacent to the left side and the right side of the active area AA. The second lines RX1 to RXk may be referred to as sensing lines.

Some of the first lines TX1 to TXh may be connected to the second pads PD2, and the remaining first lines may be connected to the third pads PD3. For example, a certain number of first lines from the left of the input sensing part ISP may be connected to the second pads PD2, and the remaining first lines may be connected to the third pads PD3.

Among the second lines RX1 to RXk, odd-numbered lines RX1, RX3, . . . , RXk−1 may be disposed in the inactive area adjacent to the left of the active area AA. Among the second lines RX1 to RXk, even-numbered lines RX2, RX4, . . . , RXk may be disposed in the inactive area adjacent to the right of the active area AA.

In the left and right inactive areas NAA, the second lines RX1 to RXk may extend in the first direction DR1 and may extend toward the lower side of the input sensing part ISP. The odd-numbered lines RX1, RX3, . . . , RXk−1 extending toward the lower side of the input sensing part ISP may be connected to the second pads PD2. The even-numbered lines RX2, RX4, . . . , RXk extending toward the lower side of the input sensing part ISP may be connected to the third pads PD3.

The first lines TX1 to TXh and the second lines RX1 to RXk may be formed in a multi-layer structure, and the configuration of the first and second lines TX1 to TXh and RX1 to RXk will be described below in detail.

Each of the first sensing electrodes SE1 may include a plurality of first sensing parts SP1 arranged along the first direction DR1 and a plurality of connecting patterns CP connecting the first sensing parts SP1. Each of the connecting patterns CP may be disposed between two of the first sensing parts SP1 adjacent to each other in the first direction DR1 and may connect the two of the first sensing parts SP1.

Each of the second sensing electrodes SE2 may include a plurality of second sensing parts SP2 arranged along the second direction DR2 and a plurality of extending patterns EP extending from the second sensing parts SP2. Each of the extending patterns EP may be disposed between two of the second sensing parts SP2 adjacent to each other in the second direction DR2 and may connect the two of the second sensing parts SP2.

The first sensing parts SP1 and the second sensing parts SP2 may be spaced apart from each other without overlapping each other and may be alternately disposed. Capacitance may be formed between the first sensing parts SP1 and the second sensing parts SP2. The extending patterns EP may not overlap with the connecting patterns CP.

Figure 7:
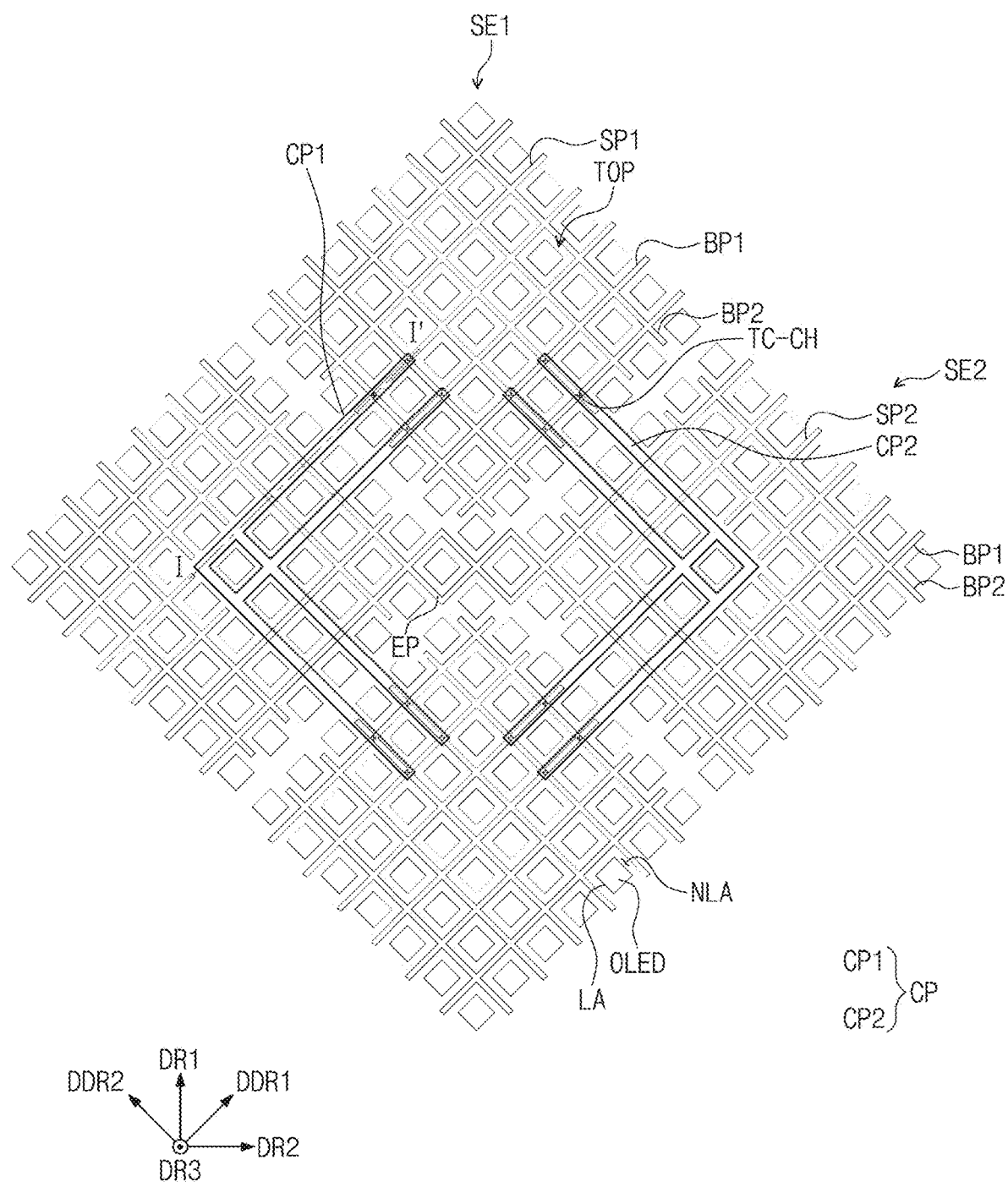
FIG. 7 is an enlarged view of two adjacent first sensing parts and two adjacent second sensing parts illustrated in FIG. 6.

FIG. 7 is an enlarged view of two adjacent first sensing parts and two adjacent second sensing parts illustrated in FIG. 6.

Referring to FIG. 7, the first sensing parts SP1 and the second sensing parts SP2 may have a mesh shape. To have a mesh shape, each of the first and second sensing parts SP1 and SP2 may include a plurality of first branch portions BP1 extending in a first diagonal direction DDR1 and a plurality of second branch portions BP2 extending in a second diagonal direction DDR2.

The first diagonal direction DDR1 may be defined as a direction slanted from the first and second directions DR1 and DR2 on the plane defined by the first and second directions DR1 and DR2. The second diagonal direction DDR2 may be defined as a direction crossing the first diagonal direction DDR1 on the plane defined by the first and second directions DR1 and DR2. For example, the first direction DR1 and the second direction DR2 may cross each other at a right angle, and the first diagonal direction DDR1 and the second diagonal direction DDR2 may cross each other at a right angle.

The first branch portions BP1 and the second branch portions BP2 of each of the first and second sensing parts SP1 and SP2 may cross each other and may be integrally formed with each other. Touch openings TOP having a rhombic shape may be defined by the first branch portions BP1 and the second branch portions BP2.

Emissive areas LA may be disposed in the touch openings TOP when viewed from the above. Light emitting elements OLED may be disposed in the emissive areas LA. Each of the emissive areas LA may be the emissive area LA illustrated in FIG. 5. The first and second sensing parts SP1 and SP2 may be disposed in a non-emissive area NLA. Since the first and second sensing parts SP1 and SP2 are disposed in the non-emissive area NLA, light transmitted from the emissive areas LA may pass through the input sensing part ISP without being interrupted by the first and second sensing parts SP1 and SP2.

A connecting pattern CP may not overlap with an extending pattern EP and may connect the first sensing parts SP1. The connecting pattern CP may be connected to the first sensing parts SP1 through a plurality of contact holes TC-CH. The structure of the contact holes TC-CH will be described below with reference to FIG. 8. The connecting pattern CP may extend toward the first sensing parts SP1 and overlap with the second sensing parts SP2.

The extending pattern EP may be disposed between the first sensing parts SP1 and may extend from the second sensing parts SP2. The second sensing parts SP2 and the extending pattern EP may be integrally formed with each other. The extending pattern EP may have a mesh shape.

The extending pattern EP, the first sensing parts SP1, and the second sensing parts P2 may be disposed in the same layer and may be formed with the same material through the same patterning. The connecting pattern CP may be disposed in a different layer than the extending pattern EP, the first sensing parts SP1, and the second sensing parts SP2 are disposed.

The connecting pattern CP may include a first connecting pattern CP1 and a second connecting pattern CP2 having shapes symmetrical to each other in the second direction DR2. The extending pattern EP may be disposed between the first connecting pattern CP1 and the second connecting pattern CP2. The first connecting pattern CP1 and the second connecting pattern CP2 may have a bent shape.

The first connecting pattern CP1 may extend over one of the two second sensing parts SP2 to connect to the first sensing parts SP1. The second connecting pattern CP2 may extend over the other one of the two second sensing parts SP2 to connect to the first sensing parts SP1.

The contact holes TC-CH may be formed in areas adjacent to both ends of the first connecting pattern CP1 and in areas adjacent to both ends of the second connecting pattern CP2. The contact holes TC-CH may overlap the first sensing parts SP1 when viewed from the above. The first connecting pattern CP1 and the second connecting pattern CP2 may be connected to the first sensing parts SP1 through the contact holes TC-CH.

A bent portion (reference numeral not illustrated) of the first connecting pattern CP1 and a bent portion (reference numeral not illustrated) of the second connecting pattern CP2 may overlap the second sensing parts SP2, respectively. A single touch opening TOP may be defined in each of the bent portion of the first connecting pattern CP1 and the bent portion of the second connecting pattern CP2. Each of the first connecting pattern CP1 and the second connecting pattern CP2 may include two mesh lines (reference numeral not illustrated) that extend toward the first sensing parts SP1.

Figure 8:
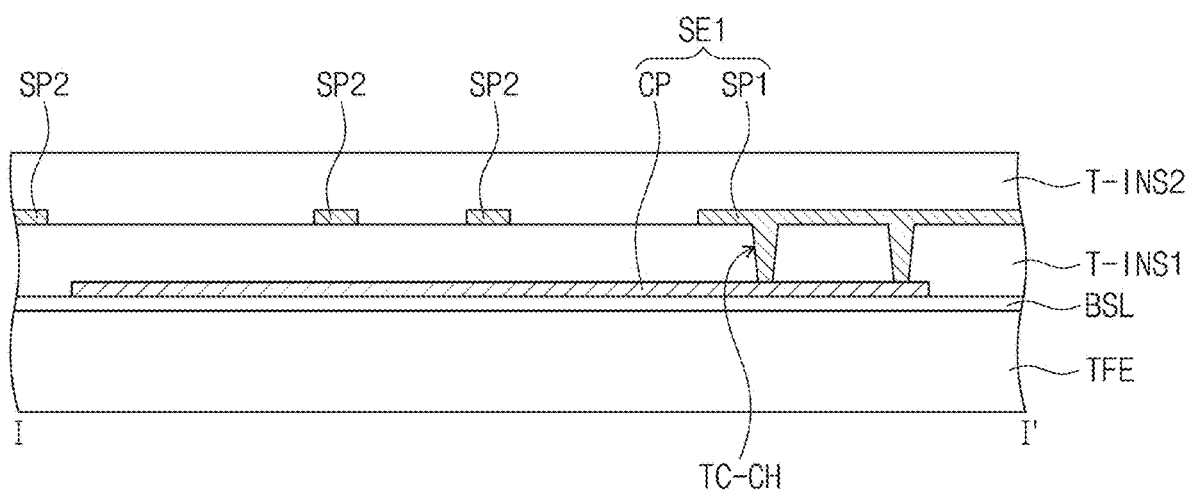
FIG. 8 is a cross-sectional view taken along a line I-I' illustrated in FIG. 7.

FIG. 8 is a cross-sectional view taken along a line I-I' illustrated in FIG. 7.

Referring to FIGS. 7 and 8, a base layer BSL may be disposed on the thin film encapsulation layer TFE. The connecting pattern CP may be disposed on the base layer BSL. A first insulating layer T-INS1 may be disposed on the connecting pattern CP and the base layer BSL. The first insulating layer T-INS1 may be disposed on the base layer BSL to cover the connecting pattern CP. The first insulating layer T-INS1 may include an organic insulating layer.

The first sensing part SP1 and the second sensing part SP2 may be disposed on the first insulating layer T-INS1. The extending pattern EP integrally formed with the second sensing part SP2 may also be disposed on the first insulating layer T-INS1. The connecting pattern CP may be connected to the first sensing part SP1 through the plurality of contact holes TC-CH defined in the first insulating layer T-INS1.

The extending pattern EP, the first sensing part SP1, and the second sensing part SP2 may be disposed on the first insulating layer T-INS1, or may be disposed in the same layer. The connecting pattern CP may be disposed below the extending pattern EP, the first sensing part SP1, and the second sensing part SP2, or may be disposed in a different layer than the extending pattern EP, the first sensing part SP1, and the second sensing part SP2.

A second insulating layer T-INS2 may be disposed on the first and second sensing parts SP1 and SP2 and the first insulating layer T-INS1. The second insulating layer T-INS2 may include an organic insulating layer.

Figure 9:
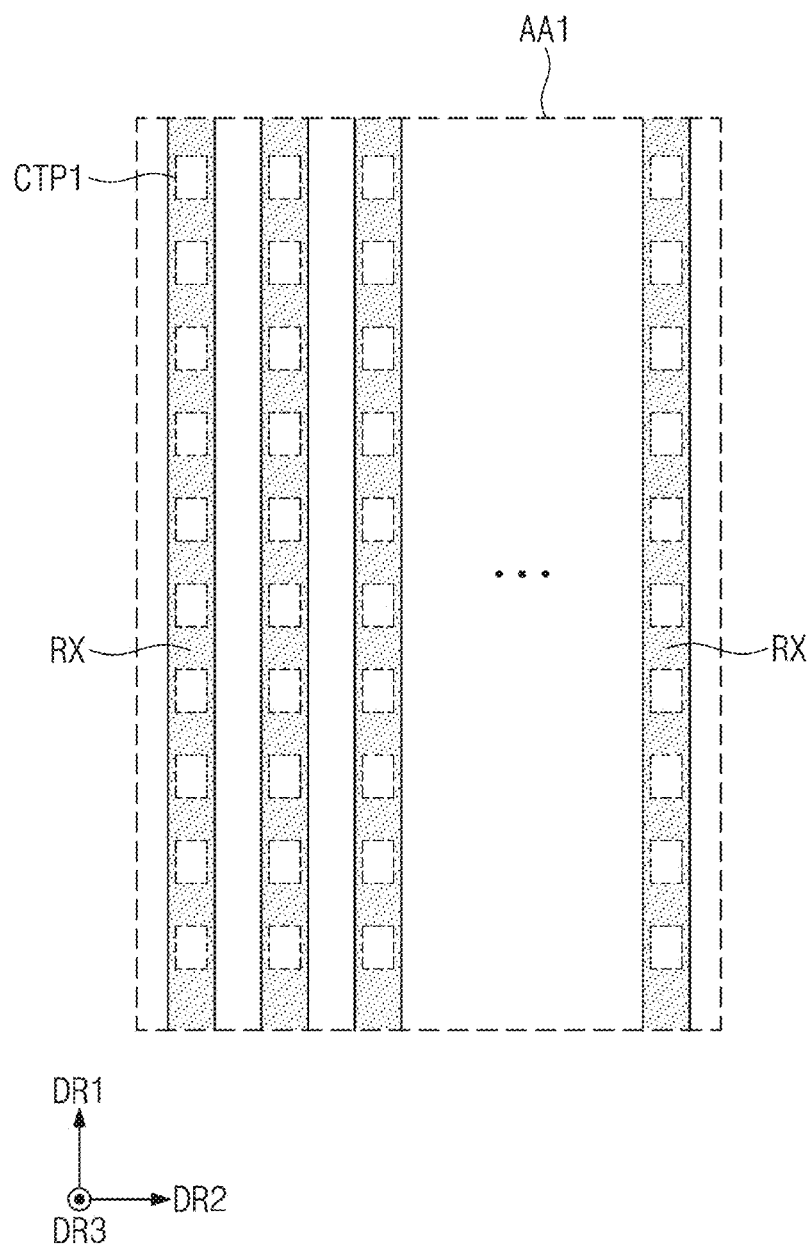
FIG. 9 is an enlarged view of a first area AA1 illustrated in FIG. 6.

FIG. 9 is an enlarged view of a first area AA1 illustrated in FIG. 6.

Referring to FIGS. 6 and 9, the inactive area NAA may include a first side area NAA1 and a second side area NAA2 that are adjacent to the left side and right side of the active area AA in the second direction DR2, respectively. The first area AA1 is an enlarged view of a partial region of the first side area NAA1.

Referring to FIG. 9, the second lines RX may extend in the first direction DR1 and may be arranged in the second direction DR2. For convenience of description, the sequence numbers (e.g., 1 to k of RX1 to RXk) for the second lines RX are omitted in FIG. 9.

A plurality of first contact portions CTP1 may be defined on each of the second lines RX. The first contact portions CTP1 may be arranged in the first direction DR1 on each of the second lines RX. For example, the first contact portions CTP1 may have a quadrangular shape and are illustrated by dotted lines. The first contact portions CTP1 illustrated in FIG. 9 may be formed on the second lines RL1 to RLk disposed in the first side area NAA1 and the second side area NAA2, as illustrated in FIG. 6.

Figure 10:
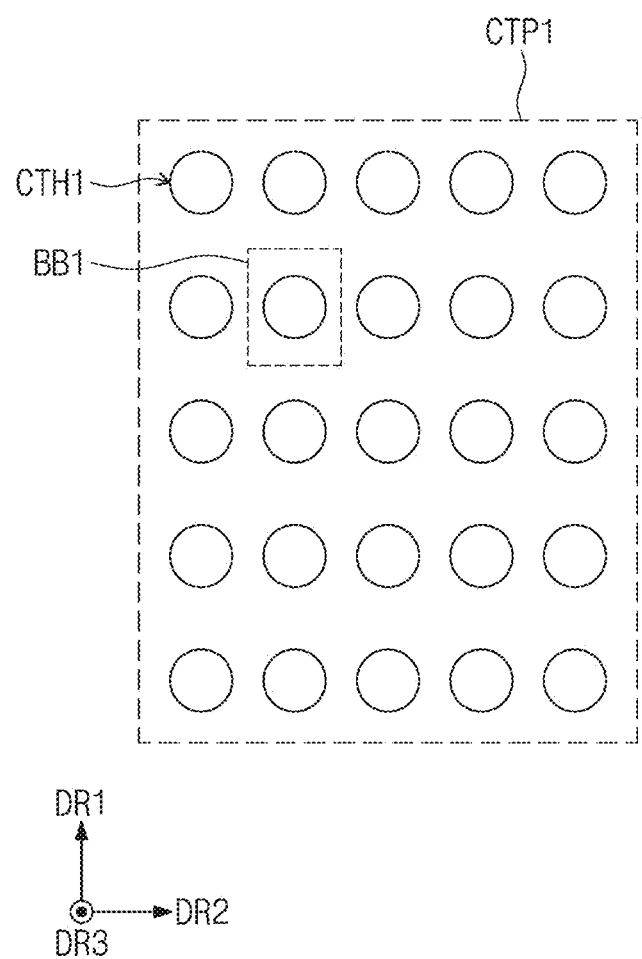
FIG. 10 is an enlarged view of one of first contact portions illustrated in FIG. 9.

FIG. 10 is an enlarged view of one of the first contact portions illustrated in FIG. 9.

Referring to FIG. 10, the first contact portion CTP1 may include a plurality of first contact holes CTH1. The first contact holes CTH1 may be arranged in a matrix form. For example, the first contact holes CTH1 may be arranged in the first direction DR1 and the second direction DR2. For example, the first contact holes CTH1 may have a circular shape. However, the shape of the first contact holes CTH1 is not limited thereto.

Figure 11:
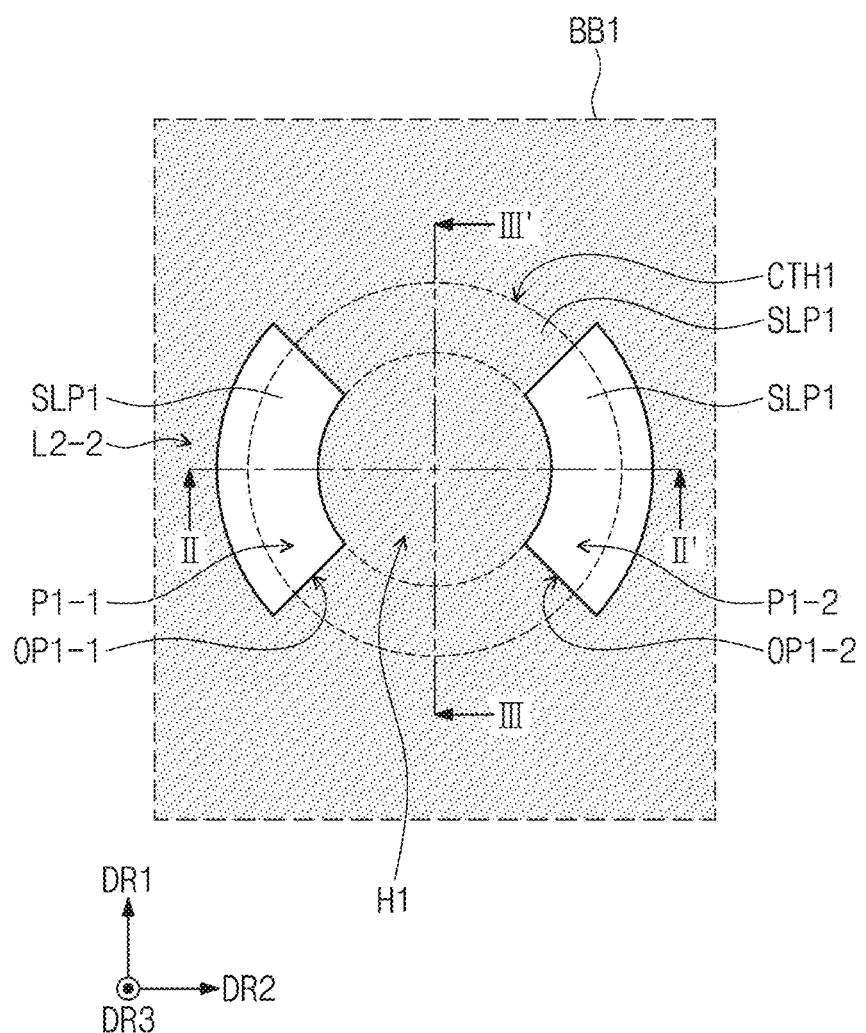
FIG. 11 is an enlarged view of a first area BB1 illustrated in FIG. 10 and illustrates the detailed shape of a first contact hole and the detailed shape of a line disposed on the first contact hole.
Figure 12:
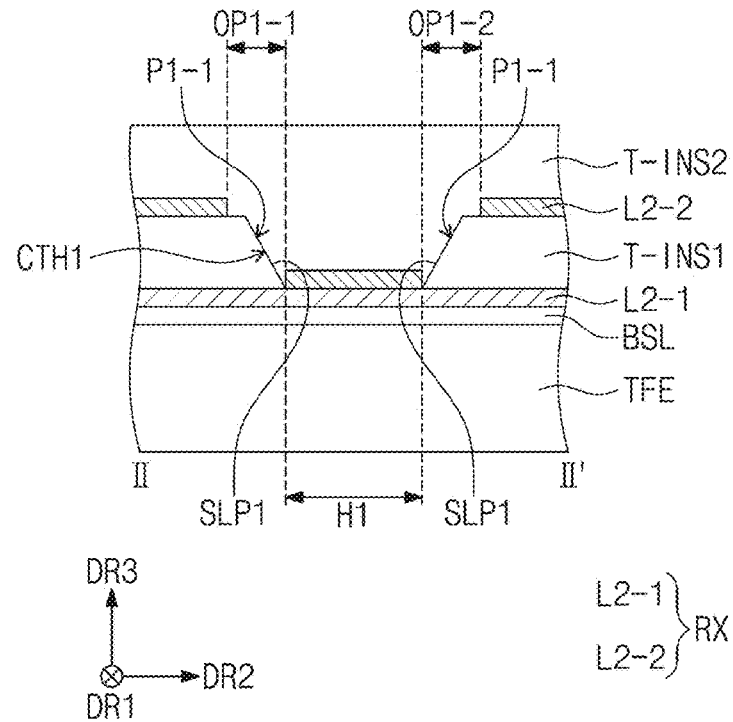
FIG. 12 is a cross-sectional view taken along a line II-II' illustrated in FIG. 11.
Figure 13:
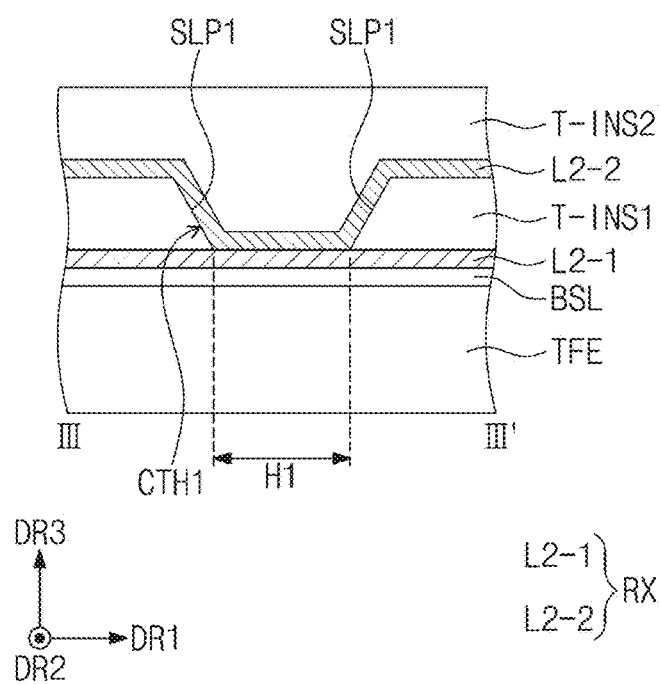
FIG. 13 is a cross-sectional view taken along a line III-III' illustrated in FIG. 11.

FIG. 11 is an enlarged view of a first area BB1 illustrated in FIG. 10 and illustrates the detailed shape of a first contact hole and the detailed arrangement of a line disposed on the first contact hole. FIG. 12 is a cross-sectional view taken along a line II-II' illustrated in FIG. 11. FIG. 13 is a cross-sectional view taken along a line III-III' illustrated in FIG. 11.

Referring to FIGS. 11, 12, and 13, the second line RX may include a second-first line L2-1 and a second-second line L2-2 disposed on the second-first line L2-1. The second-first line L2-1 may be disposed on the base layer BSL. The first insulating layer T-INS1 may be disposed on the second-first line L2-1 and the base layer BSL. The second-second line L2-2 may be disposed on the first insulating layer T-INS1.

Accordingly, the first insulating layer T-INS1 may be disposed between the second-first line L2-1 and the second-second line L2-2.

The second-first line L2-1 may be disposed in the same layer as the connecting patterns CP. The second-first line L2-1 and the connecting patterns CP may be formed with the same material through the same patterning. The second-second line L2-2 may be disposed in the same layer as the first sensing parts SP1, the second sensing parts SP2 and the extending patterns EP, as described above. The second-second line L2-2, the first and second sensing parts SP1 and SP2, and the extending patterns EP may be formed with the same material through the same patterning.

In the area other than the first contact hole CTH1, the thickness of the first insulating layer T-INS1 in the third direction DR3 may be 1.5 times to 20 times greater than the thickness of the second-first line L2-1 in the third direction DR3. The third direction DR3 may be defined as a direction perpendicular to an upper surface of the first insulating layer T-INS1. The second-first line L2-1 and the second-second line L2-2 may have the same thickness. For example, each of the second-first line L2-1 and the second-second line L2-2 may have a thickness around 6,000 Å.

The second-second line L2-2 may be electrically connected to the second-first line L2-1 through the first contact hole CTH1 formed in the first insulating layer T-INS1. Since each of the second lines RX includes the second-first line L2-1 and the second-second line L2-2 electrically connected to each other, the resistance of each of the second lines RX may be decreased. That is, due to this multi-layer structure, the resistance of each of the second lines RX1 to RXk illustrated in FIG. 6 may be decreased.

The inner surface of the first insulating layer T-INS1 that defines the first contact hole CTH1 may have a first inclined surface SLPL. The first contact hole CTH1 may be defined as an inner space surrounded by the first inclined surface SLP1.

The first contact hole CTH1 may include a first hole H1 in which a portion of the second-first line L2-1 connected to the second-second line L2-2 is disposed. The second-second line L2-2 may be disposed on the upper surface of the first insulating layer T-INS1 and the first inclined surface SLP1. The second-second line L2-2 may extend to the first hole H1 and may contact to the portion of the second-first line L2-1 disposed in the first hole H1.

The first inclined surface SLP1 may form an acute angle with a lower surface of the first insulating layer T-INS1 and may form an obtuse angle with the upper surface of the first insulating layer T-INS1. For example, the angle θs between the first inclined surface SLP1 and the lower surface of the first insulating layer T-INS1 may be in a range of 10 to 89 degrees.

The second-second line L2-2 may define a first-first opening OP1-1 corresponding to a first-first portion P1-1 of the first inclined surface SLP1 and a first-second opening OP1-2 corresponding to a first-second portion P1-2 of the first inclined surface SLP1. In other words, the first-first and first-second openings OP1-1 and OP1-2 may be defined in each of the first contact portions CTP1.

The first-first opening OP1-1 and the first-second opening OP1-2 may be arranged in the second direction DR2. The first-first opening OP1-1 and the first-second opening OP1-2 may have shapes symmetrical to each other in the second direction DR2. For example, when viewed from the above, the first-first opening OP1-1 and the first-second opening OP1-2 may have a fan shape. However, the shapes of the first-first opening OP1-1 and the first-second opening OP1-2 are not limited thereto.

Each of the first-first opening OP1-1 and the first-second opening OP1-2 may not overlap the first hole H1 when viewed from the above. Each of the first-first opening OP1-1 and the first-second opening OP1-2 may extend to a portion of the upper surface of the first insulating layer T-INS1 adjacent to the first inclined surface SLP1. However, without being limited thereto, each of the first-first opening OP1-1 and the first-second opening OP1-2 may correspond only to the first inclined surface SLP1.

The second insulating layer T-INS2 may be disposed on the second-second line L2-2. The second insulating layer T-INS2 may fill the first contact hole CTH1. In addition, the second insulating layer T-INS2 may fill the first-first opening OP1-1 and the first-second opening OP1-2. In the area other than the first contact hole CTH1, the second insulating layer T-INS2 may have the same thickness as the first insulating layer T-INS1.

The first contact portions CTP1 defined on the second lines RX1 to RXk disposed in the first side area NAA1 and the second side area NAA2 in FIG. 6 may have the structure as illustrated in FIGS. 10 to 13.

Figure 14:
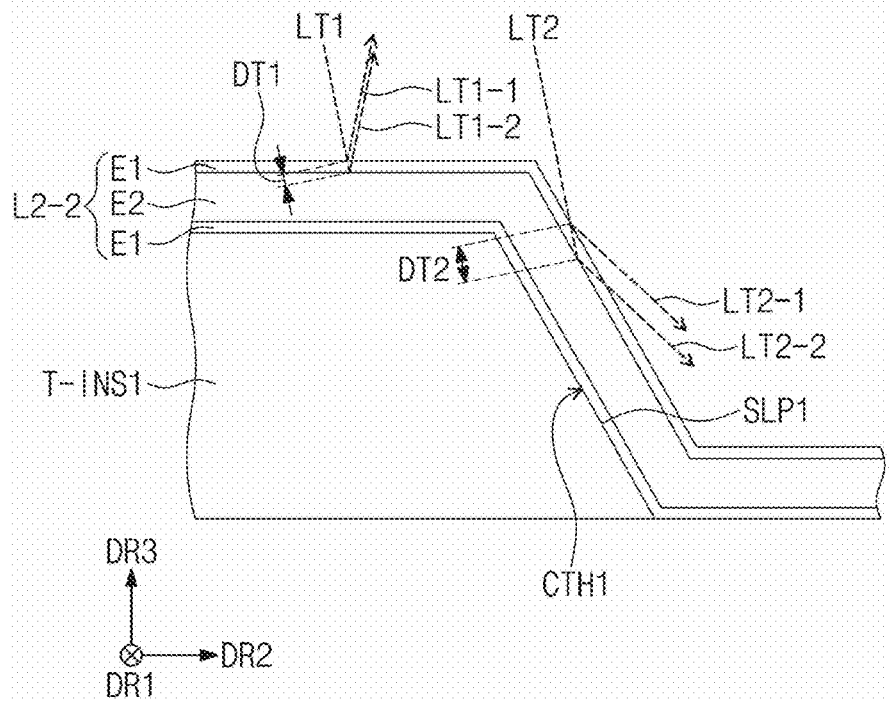
FIG. 14 is a view illustrating light reflected from a second line when the second line is disposed on a first inclined surface in a second direction.
Figure 15:
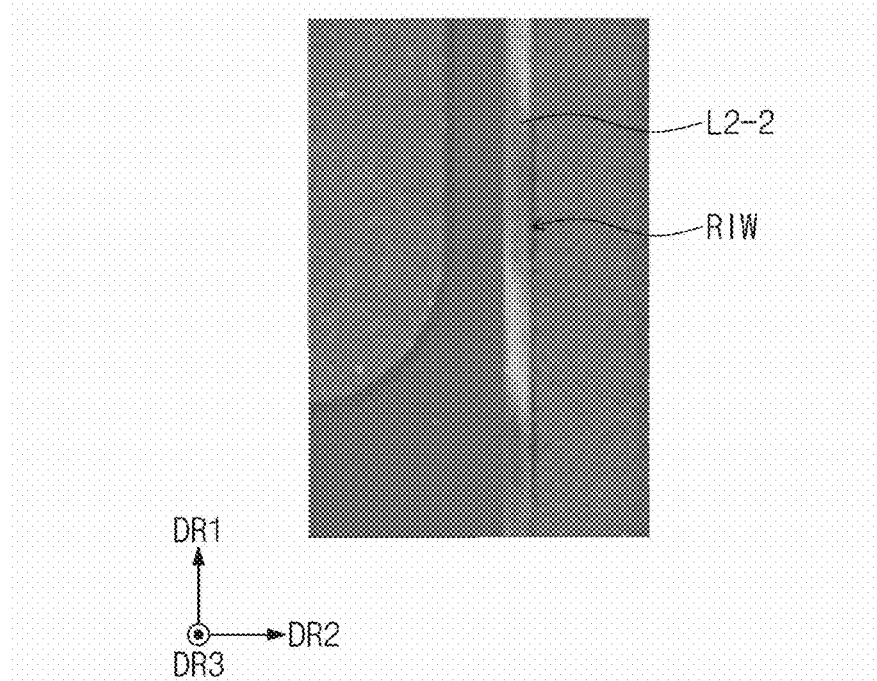
FIG. 15 is a view illustrating a rainbow-colored band capable of being observed from the second line.

FIG. 14 is a view illustrating light reflected from the second line when the second line is disposed on the first inclined surface. FIG. 15 is a view illustrating a rainbow-colored band which may be detected from the second line.

Referring to FIGS. 14 and 15, the second-second line L2-2 may include two first electrodes E1 and a second electrode E2 disposed between the first electrodes E1. The first electrodes E1 may include the same metallic material. The second electrode E2 may include a metallic material different from that of the first electrodes E1. For example, the first electrodes E1 may include titanium (Ti), and the second electrode E2 may include aluminum (Al). The second electrode E2 may be thicker than the first electrodes E1.

First light LT1 may be directed toward the second-second line L2-2 above the flat upper surface of the first insulating layer T-INS1. Second light LT2 may be directed toward the second-second line L2-2 above the first inclined surface SLPL. The first light LT1 and the second light LT2 may form the same angle with respect to the third direction DR3 and may be directed toward the second-second line L2-2.

A portion of the first light LT1 may be reflected from the upper surface of the first electrode E1 disposed on the second electrode E2. A portion of the first light LT1 may pass through the first electrode E1 and may be reflected from the upper surface of the second electrode E2. The light reflected from the first electrode E1 may be referred to as first-first light LT1-1, and the light reflected from the second electrode E2 may be referred to as first-second light LT1-2.

A portion of the second light LT2 may be reflected from the upper surface of the first electrode E1 disposed on the second electrode E2. A portion of the second light LT2 may pass through the first electrode E1 and may be reflected from the upper surface of the second electrode E2. The light reflected from the first electrode E1 may be referred to as second-first light LT2-1, and the light reflected from the second electrode E2 may be referred to as second-second light LT2-2.

The distance traveled by the first light LT1 from the upper surface of the first electrode E1 to the upper surface of the second electrode E2 may be referred to as a first distance DT1. The distance traveled by the second light LT2 from the upper surface of the first electrode E1 to the upper surface of the second electrode E2 may be referred to as a second distance DT2.

The second-second line L2-2 may be disposed in a flat state on the upper surface of the first insulating layer T-INS1 having a flat surface. The second-second line L2-2 may be disposed on the first inclined surface SLP1 and may be arranged to have an inclined surface.

The angle formed by the first light LT1 with the flat upper surface of the second-second line L2-2 may be greater than the angle formed by the second light LT2 with the inclined surface of the second-second line L2-2. Due to the difference in incident angles, the second distance DT2 may be greater than the first distance DT1.

According to on the first distance DT1, the first-second light LT1-2 may be reflected later than the first-first light LT1-1, so the phase of the first-second light LT1-2 may be delayed compared to the phase of the first-first light LT1-1. According to the second distance DT2, the second-second light LT2-2 may be reflected later than the second-first light LT2-1, so the phase of the second-second light LT2-2 may be delayed compared to the phase of the second-first light LT2-1.

Since the second distance DT2 is greater than the first distance DT1, the second-second light LT2-2 may be reflected later than the first-second light LT1-2. Therefore, the phase difference between the second-first light LT2-1 and the second-second light LT2-2 may be greater than the phase difference between the first-first light LT1-1 and the first-second light LT1-2.

The greater the phase difference, the greater the possibility of destructive and constructive interference of light between the second-first light LT2-1 and the second-second light LT2-2. When significant destructive interference and constructive interference occur, certain wavelengths within a specific color range may be enhanced or weakened due to such interference, causing reflected light to change into specific colors.

Due to this phenomenon, light reflected from the second-second line L2-2 on the first inclined surface SLP1 where the first contact hole CTH1 is defined may appear as a specific color. Since the first contact portions CTP1 including the first contact holes CTH1 are arranged in the first direction DR1, specific colors generated from the first contact holes CTH1 may appear as a rainbow-colored band RIW extending in the second direction DR1 as illustrated in FIG. 15.

When the user looks at the input sensing part ISP obliquely from the left and right sides in the second direction DR2, the above-described rainbow-colored band RIW may be observed. In other words, when viewing the first side area NAA1 and the second side area NAA2 from the left and right sides in the second direction DR2, the rainbow-colored band RIW may be visible.

In FIG. 14, the left first inclined surface SLP1 in the second direction DR2 is illustrated as an example. However, when light is reflected from the second-second line L2-2 disposed on a portion of the right first inclined surface SLP1, the above-described phenomenon may occur. In other words, when light is reflected from the second-second line L2-2 disposed on portions of the first inclined surface SLP1 that face each other in the second direction DR2, the above-described phenomenon may occur.

Referring to FIGS. 11 to 13, portions of the second-second line L2-2 disposed on the portions of the first inclined surface SLP1 that face each other in the second direction DR2 may be removed through defining the first-first opening OP1-1 and the first-second opening OP1-2.

Accordingly, light may not be reflected from the portions of the first inclined surface SLP1 that face each other in the second direction DR2. As a result, the rainbow-colored band RIW caused by light reflection may not occur.

Figure 16:
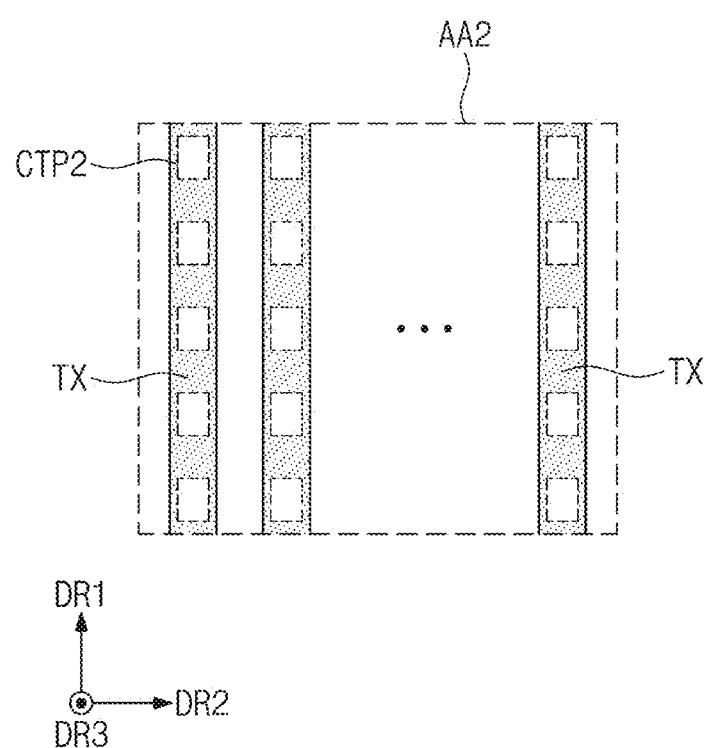
FIG. 16 is an enlarged view of a second area AA2 illustrated in FIG. 6.

FIG. 16 is an enlarged view of a second area AA2 illustrated in FIG. 6.

Referring to FIGS. 6 and 16, the inactive area NAA may include a lower area NAA3 adjacent to the active area AA in the first direction DR1. The first lines TX1 to TXh and some portion of the second lines may be disposed in the lower area NAA3. The second area AA2 is an enlarged view of a partial region of the lower area NAA3.

Referring to FIG. 16, the first lines TX may extend in the first direction DR1 and may be arranged in the second direction DR2. For convenience of description, the sequence numbers (e.g., 1 to h of TX1 to TXh) for the first lines TX are omitted in FIG. 16.

A plurality of second contact portions CTP2 may be defined on each of the first lines TX. The second contact portions CTP2 may be arranged in the first direction DR1 on each of the first lines TX. The second contact portions CTP2 may have a quadrangular shape and are illustrated by dotted lines. The second contact portions CTP2 illustrated in FIG. 16 may be formed on the first lines TX1 to TXh and some of the second lines disposed in the lower area NAA3, as illustrated in FIG. 6.

Figure 17:
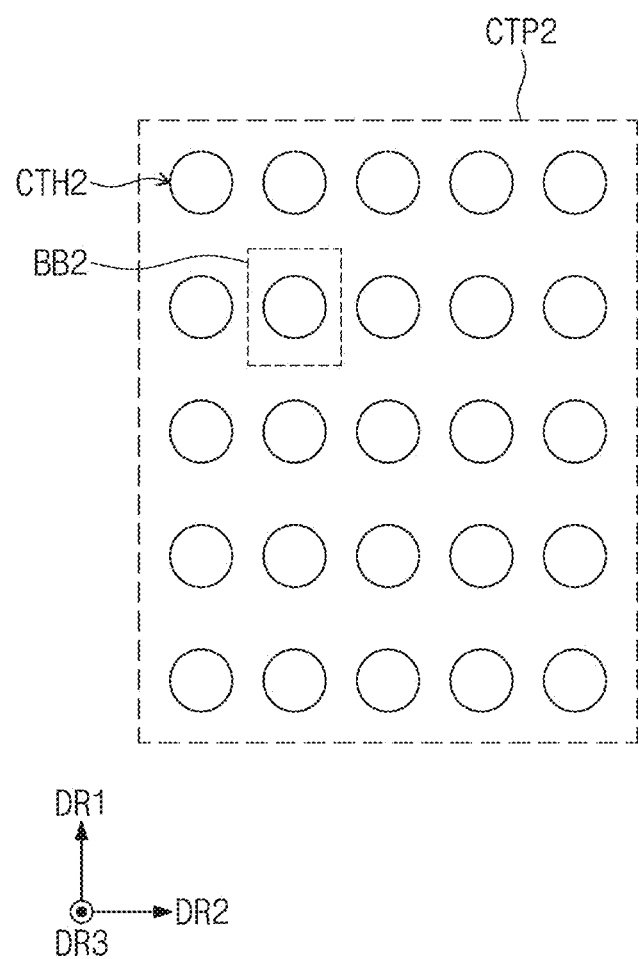
FIG. 17 is an enlarged view of one of second contact portions illustrated in FIG. 16.

FIG. 17 is an enlarged view of one of the second contact portions illustrated in FIG. 16.

Referring to FIG. 17, the second contact portion CTP2 may include a plurality of second contact holes CTH2. The second contact holes CTH2 may be arranged in the first direction DR1 and the second direction DR2 and may be arranged in a matrix form. When viewed from the above, the second contact holes CTH2 may have substantially the same shape as the first contact holes CTH1.

Figure 18:
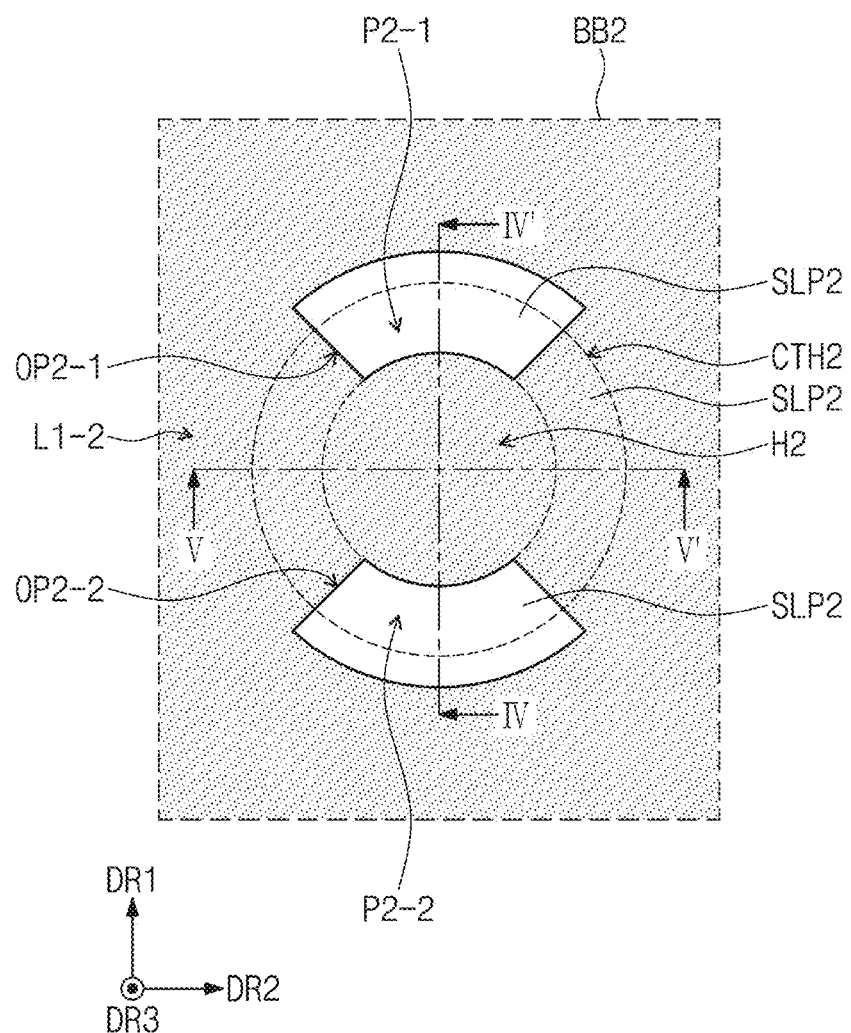
FIG. 18 is an enlarged view of a second area BB2 illustrated in FIG. 17 and illustrates the detailed shape of a second contact hole and the detailed shape of a line disposed on the second contact hole.
Figure 19:
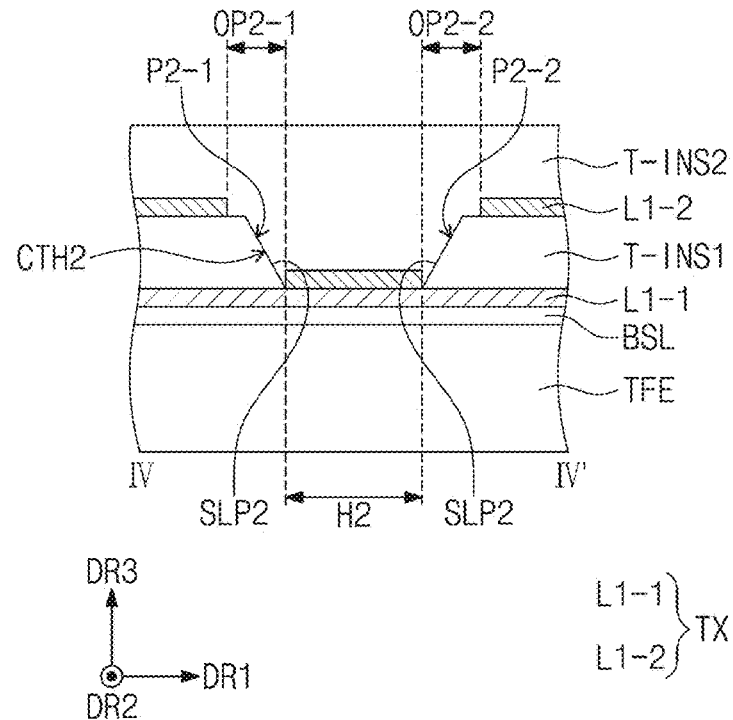
FIG. 19 is a cross-sectional view taken along a line IV-IV' illustrated in FIG. 18.
Figure 20:
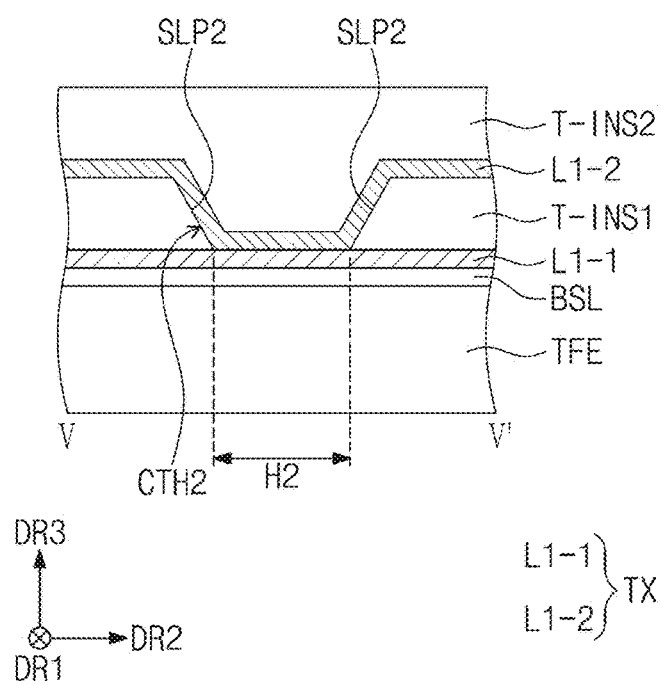
FIG. 20 is a cross-sectional view taken along a line V-V' illustrated in FIG. 18.

FIG. 18 is an enlarged view of a second area BB2 illustrated in FIG. 17 and illustrates the detailed shape of a second contact hole and the detailed arrangement of a line disposed on the second contact hole. FIG. 19 is a cross-sectional view taken along a line IV-IV' illustrated in FIG. 18. FIG. 20 is a cross-sectional view taken along a line V-V' illustrated in FIG. 18.

Referring to FIGS. 17, 18, and 19, the first line TX may include a first-first line L1-1 and a first-second line L1-2 disposed on the first-first line L1-1. The first-first line L1-1 may be disposed on the base layer BSL, and the first insulating layer T-INS1 may be disposed on the first-first line L1-1 and the base layer BSL.

The first-second line L1-2 may be disposed on the first insulating layer T-INS1. Accordingly, the first insulating layer T-INS1 may be disposed between the first-first line L1-1 and the first-second line L1-2. The second insulating layer T-INS2 may be disposed on the first-second line L1-2 and the first insulating layer T-INS1.

The first-first line L1-1 may be disposed on the same layer as the second-first line L2-1, and the first-second line L1-2 may be disposed on the same layer as the second-second line L2-2. The first-first line L1-1 and the first-second line L1-2 may have the same thickness as the second-first line L2-1 and the second-second line L2-2.

The first-second line L1-2 may be electrically connected to the first-first line L1-1 through the second contact hole CTH2 defined in the first insulating layer T-INS1. The second contact hole CTH2 may have substantially the same configuration as the above-described first contact hole CTH1. Since the first-first line L1-1 and the first-second line L1-2 are electrically connected to each other, the resistance of each of the first lines TX1 to TXh may be decreased.

The inner surface of the first insulating layer T-INS1 that defines the second contact hole CTH2 may have a second inclined surface SLP2. The second contact hole CTH2 may include a second hole H2 in which a portion of the first-first line L1-1 connected to the first-second line L1-2 is disposed. The first-second line L1-2 may contact to the portion of the first-first line L1-1 disposed in the second hole H2. The angle θs between the second inclined surface SLP2 and the lower surface of the first insulating layer T-INS1 may be in a range of 10 to 89 degrees.

The first-second line L1-2 may define a second-first opening OP2-1 corresponding to a second-first portion P2-1 of the second inclined surface SLP2. In addition, the first-second line L1-2 may define a second-second opening OP2-2 corresponding to a second-second portion P2-2 of the second inclined surface SLP2. In other words, the second-first and second-second openings OP2-1 and OP2-2 may be defined in each of the second contact portions CTP2.

The second-first opening OP2-1 and the second-second opening OP2-2 may be arranged in the first direction DR1. The second-first opening OP2-1 and the second-second opening OP2-2 may have shapes symmetrical to each other in the first direction DR1.

When viewed from the above, the second-first opening OP2-1 and the second-second opening OP2-2 may have a fan shape. However, the shapes of the second-first opening OP2-1 and the second-second opening OP2-2 are not limited thereto. In other words, although the arrangement directions differ, the second-first opening OP2-1 and the second-second opening OP2-2 may have substantially the same shape as the first-first opening OP1-1 and the first-second opening OP1-2.

The second-first opening OP2-1 and the second-second opening OP2-2 may extend to a portion of the upper surface of the first insulating layer T-INS1 adjacent to the second inclined surface SLP2 without overlapping the second hole H2 when viewed from the above. However, without being limited thereto, each of the second-first opening OP2-1 and the second-second opening OP2-2 may correspond only to the second inclined surface SLP2.

The second contact portions CTP2 defined on the first lines TX1 to TXh and some portion of the second lines disposed in the lower area NAA3 in FIG. 6 may have the structure as illustrated in FIGS. 17 to 20.

The phenomenon described above with reference to FIGS. 14 and 15 may also occur on the second contact hole CTH2. For example, when light incident toward a lower area of the input sensing part ISP in the first direction DR1 is reflected from the second inclined surface SLP2, a rainbow-colored band may be observed. In other words, when light is reflected from portions of the second inclined surface SLP2 that face each other in the first direction DR1, a rainbow-colored band may be visible.

In an embodiment of the present disclosure, portions of the first-second line L1-2 disposed on the portions of the second inclined surface SLP2 that face each other in the first direction DR1 may be removed through defining the second-first opening OP2-1 and the second-second opening OP2-2. Accordingly, light may not be reflected from the portions of the second inclined surface SLP2 that face each other in the first direction DR1. As a result, a rainbow-colored band caused by light reflection may not occur.

Referring to FIGS. 6, 10 to 14, and 17 to 20, some portion of the second lines may be disposed in lower corner areas CNA of the input sensing part ISP. Contact portions (not illustrated) may be defined on the second lines disposed in the corner areas CNA, and contact holes (not illustrated) in the contact portions may have substantially the same configuration as the first and second contact holes CTH1 and CTH2 illustrated in FIGS. 11 to 13 or 18 to 20.

Although not illustrated, the first-first and first-second openings OP1-1 and OP1-2 illustrated in FIGS. 11 to 13 may be defined in second-second lines disposed on the contact holes of the second lines disposed in the corner areas CNA. However, the present disclosure is not limited thereto, and the second-first and second-second openings OP2-1 and OP2-2 illustrated in FIGS. 18 to 20 may be defined in the second-second lines disposed on the contact holes of the second lines disposed in the corner areas CNA.

Figure 21A:
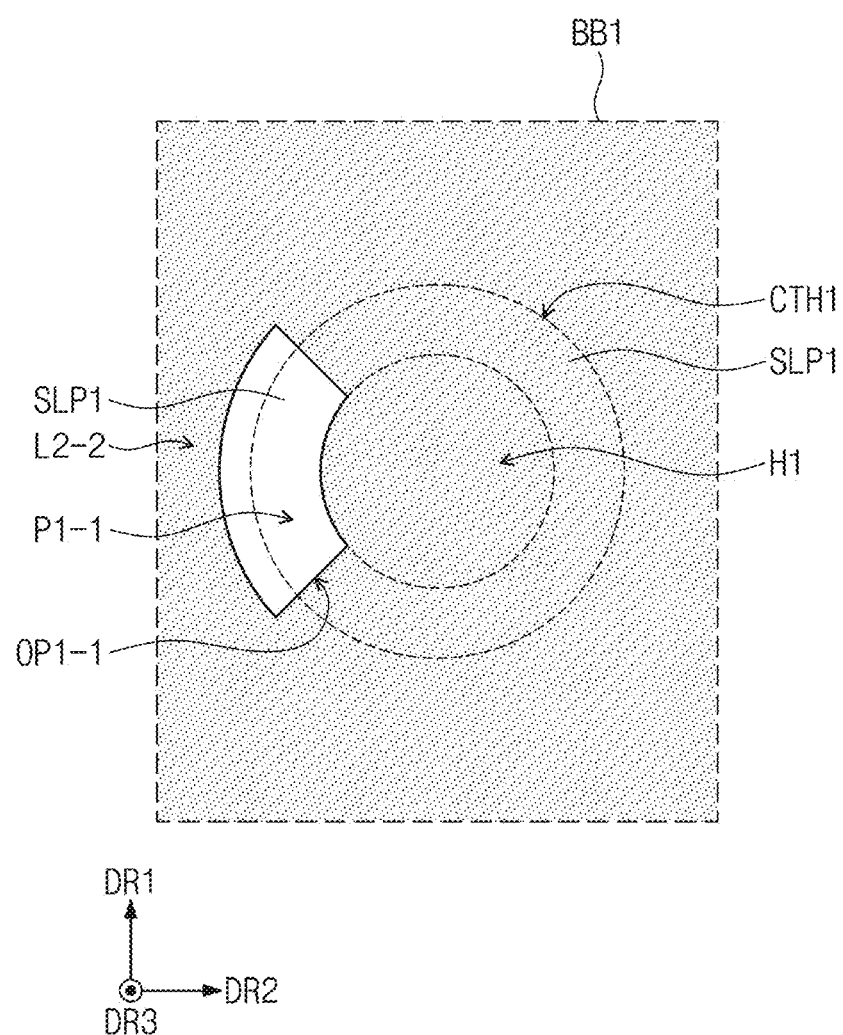
FIGS. 21A and 21B are views illustrating the shapes of openings defined on the first inclined surface according to an embodiment of the present disclosure.
Figure 21B:
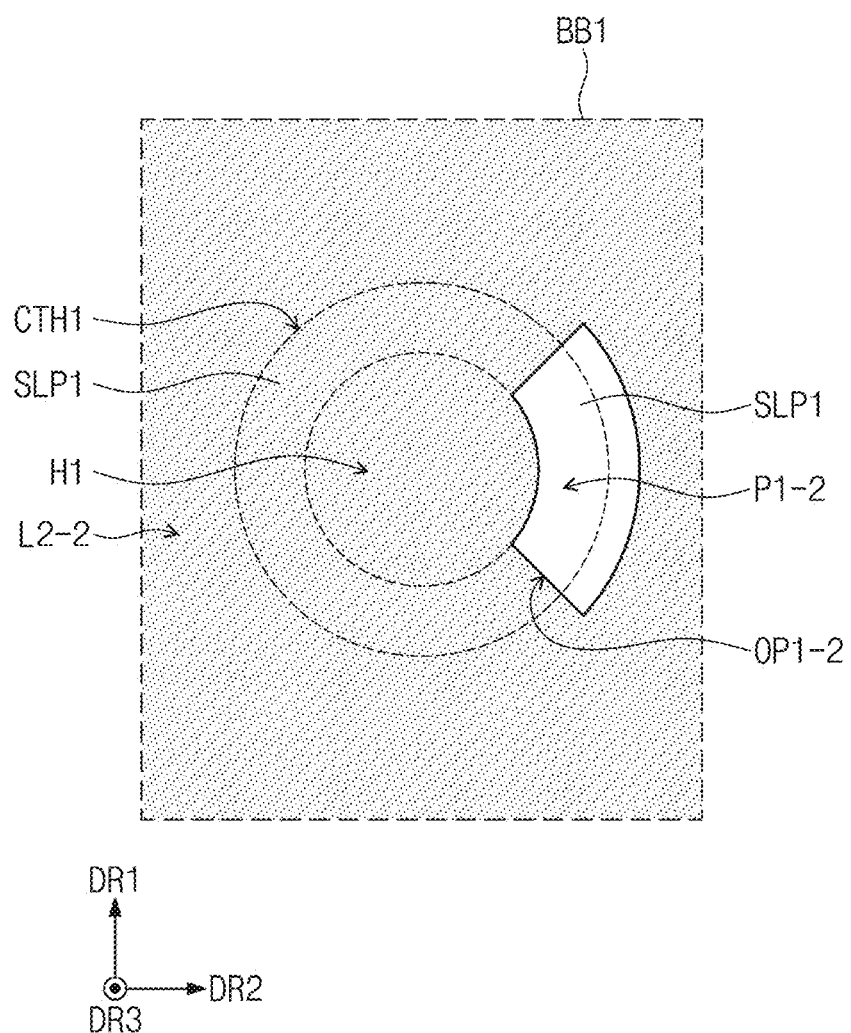

FIGS. 21A and 21B are views illustrating the shapes of openings defined on the first inclined surface according to an embodiment of the present disclosure.

FIGS. 21A and 21B are plan views corresponding to FIG. 11. The following description will be focused on the difference between the elements illustrated in FIG. 11 and the elements illustrated in FIGS. 21A and 21B.

Referring to FIGS. 21A and 21B, unlike in FIG. 11, only one of the first-first opening OP1-1 and the first-second opening OP1-2 may be defined in the second-second line L2-2. For example, as illustrated in FIG. 21A, only the first-first opening OP1-1 may be defined in the second-second line L2-2, or as illustrated in FIG. 21B, only the first-second opening OP1-2 may be defined in the second-second line L2-2.

Figure 22A:
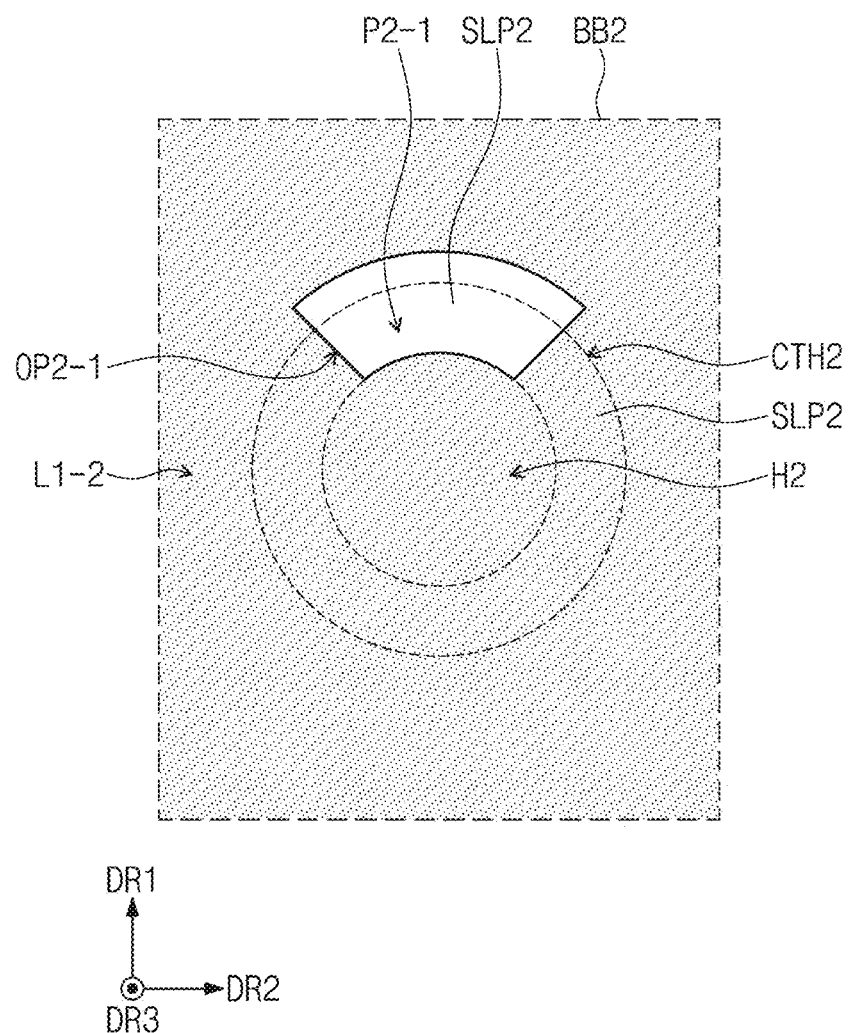
FIGS. 22A and 22B are views illustrating the shapes of openings defined on a second inclined surface according to an embodiment of the present disclosure.
Figure 22B:
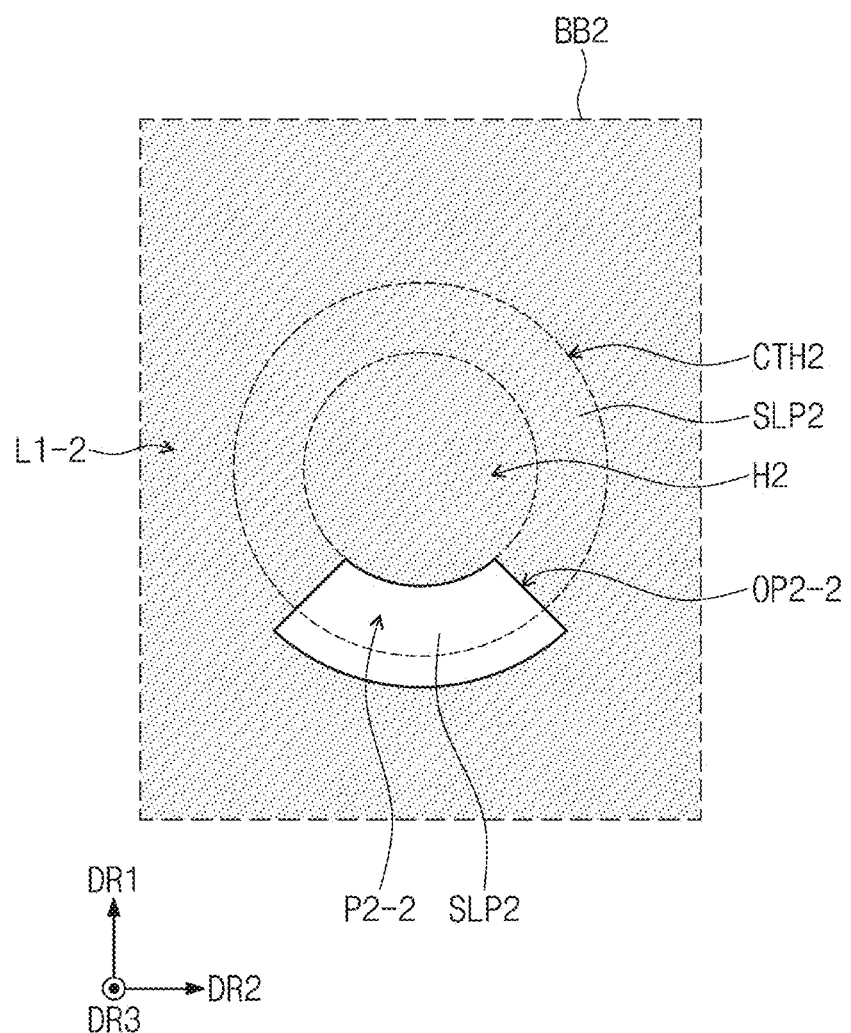

FIGS. 22A and 22B are views illustrating the shapes of openings defined on the second inclined surface according to an embodiment of the present disclosure.

FIGS. 22A and 22B are plan views corresponding to FIG. 18. The following description will be focused on the difference between the elements illustrated in FIG. 18 and the elements illustrated in FIGS. 22A and 22B.

Referring to FIGS. 22A and 22B, unlike in FIG. 18, only one of the second-first opening OP2-1 and the second-second opening OP2-2 may be defined in the first-second line L1-2. For example, as illustrated in FIG. 22A, only the second-first opening OP2-1 may be defined in the first-second line L1-2, or as illustrated in FIG. 22B, only the second-second opening OP2-2 may be defined in the first-second line L1-2.

Figure 23:
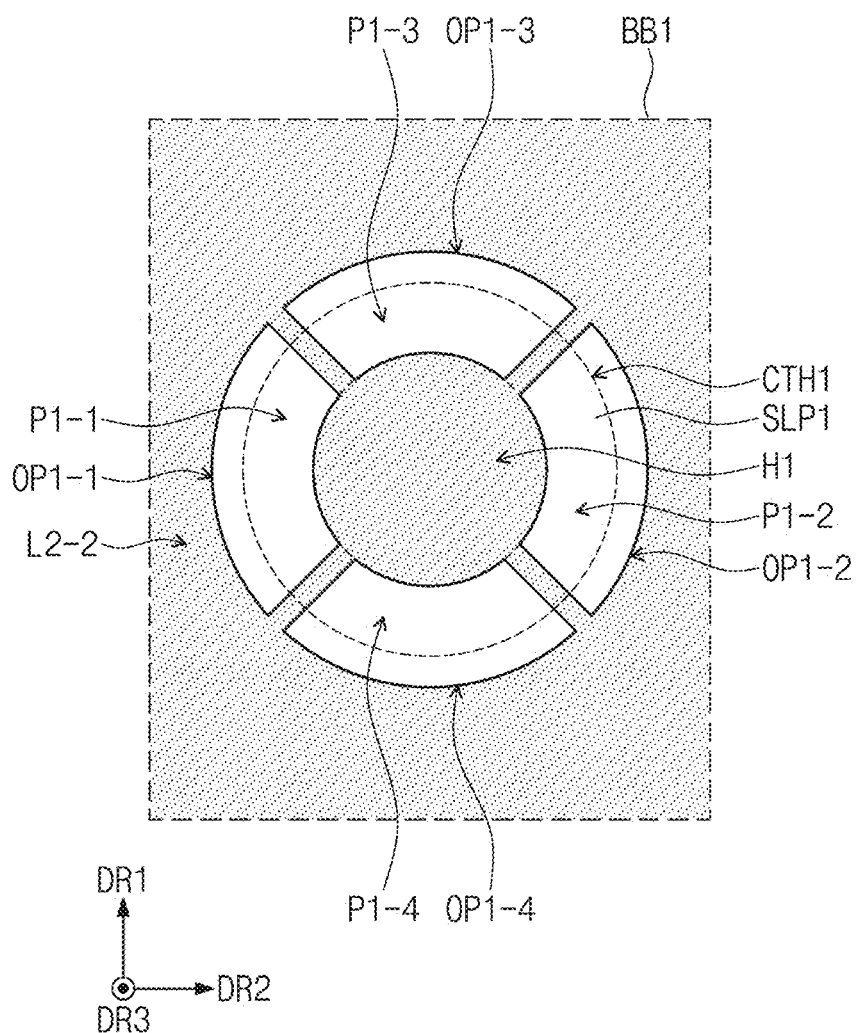
FIG. 23 is a view illustrating the shapes of openings defined on the first inclined surface according to an embodiment of the present disclosure.

FIG. 23 is a view illustrating the shapes of openings defined on the first inclined surface according to an embodiment of the present disclosure.

FIG. 23 is a plan view corresponding to FIG. 11. The following description will be focused on the difference between the elements illustrated in FIG. 11 and the elements illustrated in FIG. 23.

Referring to FIG. 23, a first-third opening OP1-3 corresponding to a first-third portion P1-3 of the first inclined surface SLP1 and a first-fourth opening OP1-4 corresponding to a first-fourth portion P1-4 of the first inclined surface SLP1 may be additionally defined in the second-second line L2-2.

The first-first opening OP1-1 and the first-second opening OP1-2 may be arranged in the second direction DR2 with the first hole H1 therebetween. The first-third opening OP1-3 and the first-fourth opening OP1-4 may be arranged in the first direction DR1 with the first hole H1 therebetween. The second direction DR2 may be defined as one direction, and the first direction DR1 may be defined as another direction crossing the one direction.

Figure 24:
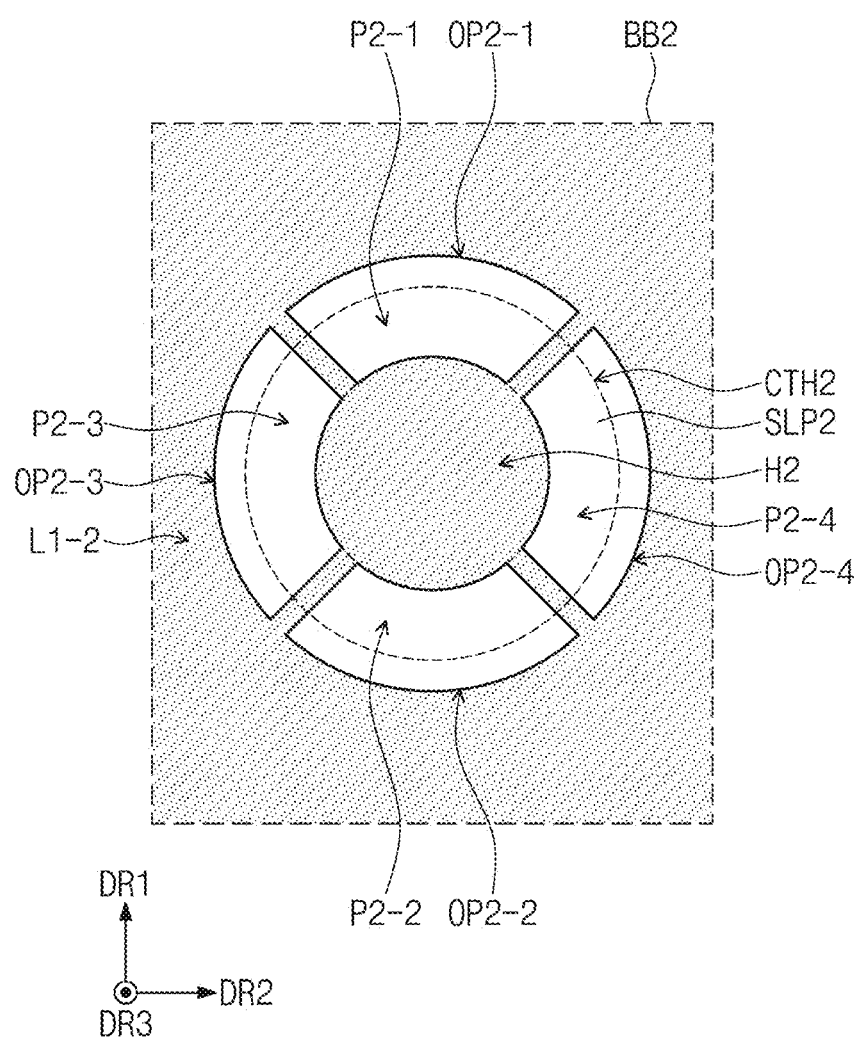
FIG. 24 is a view illustrating the shapes of openings defined on the second inclined surface according to an embodiment of the present disclosure.

FIG. 24 is a view illustrating the shapes of openings defined on the second inclined surface according to an embodiment of the present disclosure.

FIG. 24 is a plan view corresponding to FIG. 18. The following description will be focused on the difference between the elements illustrated in FIG. 18 and the elements illustrated in FIG. 24.

Referring to FIG. 24, a second-third opening OP2-3 corresponding to a second-third portion P2-3 of the second inclined surface SLP2 and a second-fourth opening OP2-4 corresponding to a second-fourth portion P2-4 of the second inclined surface SLP2 may be additionally defined in the first-second line L1-2.

The second-first opening OP2-1 and the second-second opening OP2-2 may be arranged in the first direction DR1 with the second hole H2 therebetween. The second-third opening OP2-3 and the second-fourth opening OP2-4 may be arranged in the second direction DR2 with the second hole H2 therebetween.

Figure 25:
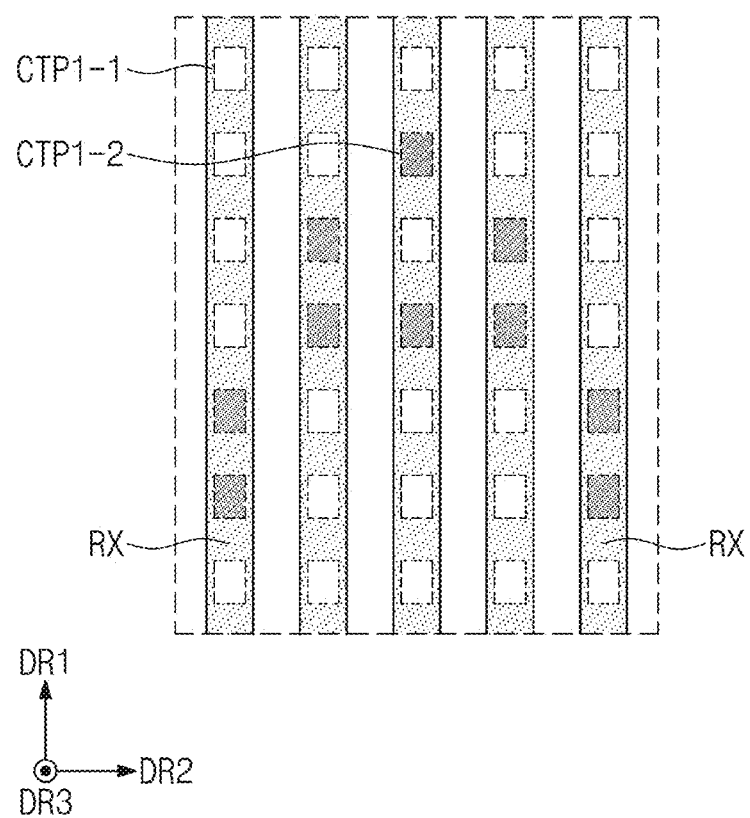
FIG. 25 is a view illustrating a character formed using contact portions according to an embodiment of the present disclosure.

FIG. 25 is a view illustrating a character formed using contact portions according to an embodiment of the present disclosure.

Referring to FIG. 25, a plurality of first-first contact portions CTP1-1 and a plurality of first-second contact portions CTP1-2 may be defined on first lines RX. The first-first contact portions CTP1-1 may be the above-described first contact portions CTP1. In other words, the first-first contact portions CTP1-1 may define the first-first openings OP1-1 and the first-second openings OP1-2. In contrast, the first-second contact portions CTP1-2 contact portions may not define the first-first openings OP1-1 and the first-second openings OP1-2.

The first-second contact portions CTP1-2 may be arranged in the form of a specific character. For example, the first-second contact portions CTP1-2 may be arranged in the form of "A". The first-first contact portions CTP1-1 may be disposed around the first-second contact portions CTP1-2.

The first-first contact portions CTP1-1 in which the first-first and first-second openings OP1-1 and OP1-2 are defined and the first-second contact portions CTP1-2 in which the first-first and first-second openings OP1-1 and OP1-2 are not defined may have different light transmittances depending on whether the openings are defined. Therefore, the first-first contact portions CTP1-1 and the first-second contact portions CTP1-2 may be distinguished from each other. As a result, the first-second contact portions CTP1-2 are arranged in the shape of "A" character, allowing the "A" character to be discernible to the user.

Although the letter "A" is illustrated as an example, embodiments of the present disclosure are not limited thereto. The first-second contact portions CTP1-2 may be arranged in the forms of various characters, and the various characters may be visible to the user.

According to the embodiments of the present disclosure, at least one opening may be defined in each of the first-second line L1-2 and the second-second line L2-2 in a position corresponding to the inner surface of the insulating layer that defines the contact hole. Since the first-second line L1-2 and the second-second line L2-2 which may reflect light are not disposed on the inner surface of the insulating layer, a rainbow-colored band shape due to light reflection may not occur.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An input sensing part comprising:
a first sensing electrode;
a second sensing electrode crossing the first sensing electrode and insulated from the first sensing electrode;
a first line connected to the first sensing electrode;
a second line connected to the second sensing electrode, the second line comprising a second-first line and a second-second line disposed on the second-first line; and
an insulating layer disposed between the second-first line and the second-second line,
wherein the second-second line is connected to the second-first line through a first contact hole defined in the insulating layer,
wherein an inner surface of the insulating layer defining the first contact hole has a first inclined surface, and the first inclined surface comprises a first-first portion, and
wherein the second-second line defines a first-first opening corresponding to the first-first portion of the first inclined surface.

2. The input sensing part of claim 1, wherein in an area other than the first contact hole, the insulating layer has a thickness 1.5 times to 20 times greater than a thickness of the second-first line in a direction perpendicular to an upper surface of the insulating layer.

3. The input sensing part of claim 1, wherein the first inclined surface has an acute angle with respect to a lower surface of the insulating layer.

4. The input sensing part of claim 3, wherein the acute angle between the first inclined surface and the lower surface of the insulating layer is in a range of 10 degrees to about 89 degrees.

5. The input sensing part of claim 1, wherein the insulating layer comprises an organic insulating layer.

6. The input sensing part of claim 1, wherein the first sensing electrode extends in a first direction, the second sensing electrode extends in a second direction crossing the first direction, and the first and second sensing electrodes are disposed in an active area, and
wherein the first line is disposed in an inactive area adjacent to the active area in the first direction, and the second line is disposed in an inactive area adjacent to the active area in the second direction.

7. The input sensing part of claim 6, wherein the second-second line defines a first-second opening corresponding to a first-second portion of the first inclined surface.

8. The input sensing part of claim 7, wherein the first-first opening and the first-second opening are arranged in the second direction.

9. The input sensing part of claim 8, wherein the first-first opening and the first-second opening have shapes symmetrical to each other in the second direction.

10. The input sensing part of claim 8, wherein the first contact hole comprises a first hole that extends to a portion of the second-first line connected to the second-second line, and
wherein the first-first opening and the first-second opening are spaced apart in a plan view.

11. The input sensing part of claim 8, wherein the second-second line defines a first-third opening corresponding to a first-third portion of the first inclined surface and a first-fourth opening corresponding to a first-fourth portion of the first inclined surface, and wherein the first-third opening and the first-fourth opening are arranged in the first direction.

12. The input sensing part of claim 6, wherein the first line includes:
a first-first line; and
a first-second line disposed on the first-first line,
wherein the insulating layer is disposed between the first-first line and the first-second line,
wherein the first-second line is connected to the first-first line through a second contact hole defined in the insulating layer,
wherein an inner surface of the insulating layer defining the second contact hole has a second inclined surface, and the second inclined surface comprises a second-first portion and a second-second portion, and
wherein the first-second line defines a second-first opening corresponding to the second-first portion of the second inclined surface and a second-second opening corresponding to the second-second portion of the second inclined surface.

13. The input sensing part of claim 12, wherein the second-first opening and the second-second opening are arranged in the first direction.

14. The input sensing part of claim 13, wherein the second-first opening and the second-second opening have shapes symmetrical to each other in the first direction.

15. The input sensing part of claim 13, wherein the second contact hole includes a second hole in which a portion of the first-first line is connected to the first-second line, and
wherein the second-first opening and the second-second opening are spaced apart in a plan view.

16. The input sensing part of claim 13, wherein the first-second line defines a second-third opening corresponding to a second-third portion of the second inclined surface and a second-fourth opening corresponding to a second-fourth portion of the second inclined surface, and
wherein the second-third opening and the second-fourth opening are arranged in the second direction.

17. A display device comprising:
a display panel; and
an input sensing part disposed on the display panel,
wherein the input sensing part includes:
a first sensing electrode;
a second sensing electrode crossing the first sensing electrode and insulated from the first sensing electrode;
a first line connected to the first sensing electrode;
a second line connected to the second sensing electrode, the second line comprising a second-first line and a second-second line disposed on the second-first line; and
an insulating layer disposed between the second-first line and the second-second line,
wherein the second-second line is connected to the second-first line through a first contact hole defined in the insulating layer,
wherein an inner surface of the insulating layer defining the first contact hole has a first inclined surface, and the first inclined surface comprises a first-first portion and a first-second portion, and
wherein the second-second line defines a first-first opening corresponding to the first-first portion of the first inclined surface and a first-second opening corresponding to the first-second portion of the first inclined surface.

18. The display device of claim 17, wherein the first contact hole comprises a first hole in which a portion of the second-first line is connected to the second-second line, and
wherein the first-first opening and the first-second opening are spaced apart in a plan view.

19. The display device of claim 18, wherein the first-first opening and the first-second opening are arranged in one direction with the first hole therebetween.

20. The display device of claim 19, wherein the second-second line defines a first-third opening corresponding to a first-third portion of the first inclined surface and a first-fourth opening corresponding to a first-fourth portion of the first inclined surface, and
wherein the first-third opening and the first-fourth opening are arranged in another direction crossing the one direction with the first hole therebetween.

* * * * *